United States Patent
Iwase et al.

(10) Patent No.: US 11,605,805 B2
(45) Date of Patent: Mar. 14, 2023

(54) METHOD OF MANUFACTURING FORMED BODY FOR ELECTRODE

(71) Applicant: FUJIFILM CORPORATION, Tokyo (JP)

(72) Inventors: Eijiro Iwase, Kanagawa (JP); Akihito Fukunaga, Kanagawa (JP); Takehiko Nakayama, Kanagawa (JP); Koji Tonohara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/563,092

(22) Filed: Dec. 28, 2021

(65) Prior Publication Data

US 2022/0123275 A1 Apr. 21, 2022

Related U.S. Application Data

(63) Continuation of application No. PCT/JP2020/031153, filed on Aug. 18, 2020.

(30) Foreign Application Priority Data

Aug. 19, 2019 (JP) .............................. JP2019-149867

(51) Int. Cl.
*H01M 4/04* (2006.01)
*H01M 10/0525* (2010.01)
(Continued)

(52) U.S. Cl.
CPC ..... *H01M 4/0411* (2013.01); *H01M 10/0525* (2013.01); *B05C 5/0254* (2013.01);
(Continued)

(58) Field of Classification Search
CPC ........... H01M 4/0411; H01M 10/0525; H01M 2004/021; B05D 1/26; B05D 1/265; B05C 5/02; B05C 5/0254; B29C 41/28
(Continued)

(56) References Cited

U.S. PATENT DOCUMENTS 8,951,669 B2 2/2015 Lee et al.
2001/0012588 A1 8/2001 Kaido et al.
(Continued)

FOREIGN PATENT DOCUMENTS

JP H09-245776 A 9/1997
JP H10-340727 A 12/1998
(Continued)

OTHER PUBLICATIONS

Elcometer inspection equipment, "Film Application Elcometer 3505 Cube Film Applicators", Dec. 31, 2015, Retrieved from the Internet: URL: https://www.elcometer.com/pub/media/contentmanager/content///3505_1.pdf.
(Continued)

*Primary Examiner* — Brian K Talbot
(74) *Attorney, Agent, or Firm* — Solaris Intellectual Property Group, PLLC

(57) ABSTRACT

A method of manufacturing a formed body for an electrode includes: preparing an electrode material; placing a shape retaining member having an rectangular tubular shape with one opening portion L thereof facing down, and supplying the electrode material into the shape retaining member from the other opening portion M thereof; and discharging the electrode material onto a support from the opening portion L while relatively moving the opening portion L and the support, to form a film, a bulk density $D_1$ of the electrode material in the first step and a bulk density $D_2$ of the electrode material at the opening portion L satisfying a
(Continued)

relationship of $D_2/D_1=1.1$ to 30, and a width $T_1$ of the opening portion L in a short side direction and a distance $T_2$ between the end portion X of the opening portion L and the support satisfying a relationship of width $T_1>$distance $T_2$.

8 Claims, 2 Drawing Sheets

(51) Int. Cl.
  *H01M 4/02* (2006.01)
  *B05D 1/26* (2006.01)
  *B05C 5/02* (2006.01)
  *B29C 41/28* (2006.01)

(52) U.S. Cl.
  CPC ............... *B05D 1/26* (2013.01); *B05D 1/265* (2013.01); *B29C 41/28* (2013.01); *H01M 2004/021* (2013.01)

(58) Field of Classification Search
  USPC .......................................................... 427/58
  See application file for complete search history.

(56) References Cited

U.S. PATENT DOCUMENTS

| | | | |
|---|---|---|---|
| 2003/0203099 A1* | 10/2003 | Suzuki | B05D 1/26 427/9 |
| 2014/0242459 A1 | 8/2014 | Sanada | |
| 2014/0342225 A1 | 11/2014 | Isshiki et al. | |
| 2016/0149208 A1 | 5/2016 | Suzuki et al. | |
| 2017/0352874 A1 | 12/2017 | Hosono et al. | |
| 2018/0221908 A1* | 8/2018 | Enokihara | B05D 1/26 |
| 2018/0277901 A1 | 9/2018 | Mochizuki et al. | |
| 2022/0134379 A1* | 5/2022 | Lee | B05D 5/12 427/58 |

FOREIGN PATENT DOCUMENTS

| | | | |
|---|---|---|---|
| JP | 3614990 B2 | 1/2005 | |
| JP | 2011161712 A * | 8/2011 | ............ B29C 41/28 |
| JP | 2013-077560 A | 4/2013 | |
| JP | 2014-164982 A | 9/2014 | |
| JP | 2014-522549 A | 9/2014 | |
| JP | 2019-67586 A | 4/2019 | |
| JP | 2020-87856 A | 6/2020 | |
| WO | 2016/111137 A1 | 7/2016 | |
| WO | 2017/104405 A1 | 6/2017 | |

OTHER PUBLICATIONS

Elcometer inspection equipment, "Film Application Elcometer 3508 & 3560 4 Gap Applicator with Reservoir", Dec. 31, 2015, Retrieved from the Internet: URL: https://www.elcometer.com/pub/media/contentmanager/content///3508_3560.pdf.

Extended European Search Report dated Aug. 18, 2022, issued in corresponding EP Patent Application No. 20854716.6.

English language translation of the following: Office action dated Aug. 23, 2022 from the JPO in a Japanese patent application No. 2021-540951 corresponding to the instant patent application.

International Search Report issued in International Application No. PCT/JP2020/031153 dated Oct. 20, 2020.

Written Opinion of the ISA issued in International Application No. PCT/JP2020/031153 dated Oct. 20, 2020.

* cited by examiner

METHOD OF MANUFACTURING FORMED BODY FOR ELECTRODE

CROSS-REFERENCE TO RELATED APPLICATIONS

This application is a continuation application of International Application No. PCT/JP2020/031153, filed Aug. 18, 2020, the disclosure of which is incorporated herein by reference in its entirety. Further, this application claims priority from Japanese Patent Application No. 2019-149867, filed Aug. 19, 2019, the disclosure of which is incorporated herein by reference in its entirety.

BACKGROUND OF THE INVENTION

1. Field of the Invention

The present disclosure relates to a method of manufacturing a formed body for an electrode.

2. Description of the Related Art

An electrolytic solution is usually used as an electrolyte contained in a battery such as a lithium ion battery. In recent years, from the viewpoint of safety (for example, prevention of liquid leakage), the development of an all-solid state battery that replaces an electrolytic solution with a solid electrolyte has been considered.

In the manufacturing of an electrode to be applied to the battery described above, a coating liquid containing an electrode material such as an active material and a solvent is usually used (for example, WO2017/104405A).

As for the manufacturing of an electrode for a lithium ion battery using an electrode active material-containing powder, for example, there is known a method of manufacturing an electrode for a lithium ion battery in which a powder layer is formed by squeezing an electrode active material-containing powder supplied onto a substrate by a squeegee roll, and then while the substrate is transported in a vertical downward direction, the powder layer is compacted on the substrate by a pair of pressing rolls to manufacture an electrode sheet, including a supply step of supplying the powder onto the substrate, a powder layer forming step of forming the powder layer by leveling the powder supplied onto the substrate by the squeegee roll disposed at a position where a squeegee angle θ formed between a vertical line passing through a rotation axis of one of the pressing rolls and a line passing through the rotation axis and a rotation axis of the squeegee roll is 0° to 60°, and a compacting step of compacting the powder layer on the substrate by the pair of pressing rolls (for example, see WO2016/111137A).

SUMMARY OF THE INVENTION

In the method of forming an electrode using a coating liquid (for example, the method described in WO2017/104405A), it is usually necessary to dry the coating liquid. In a case where the drying is not sufficiently performed, the solvent may remain in the electrode, and the battery performance (for example, discharge capacity and output characteristics) may thus be reduced. In particular, in an all-solid state battery, the amount of the solvent remaining in the electrode is preferably small.

Therefore, for example, WO2016/111137A proposes a method of manufacturing an electrode for a battery using a powder.

In WO2016/111137A, a step of supplying a powder onto a substrate is provided, and then a powder layer is formed by a squeegee and compacted to obtain an electrode for a battery. However, in a case where the mass distribution of the powder supplied onto the substrate is large in the step of supplying the powder onto the substrate, an electrode for a battery having a large in-plane variation in density distribution may be manufactured even after the subsequent steps.

Accordingly, the present disclosure is contrived in view of the above circumstances.

An object of an embodiment of the present disclosure is to provide a method of manufacturing a formed body for an electrode, in which a formed body for an electrode that is excellent in in-plane uniformity of a mass distribution can be manufactured.

The present disclosure includes the following aspects.

<1> A method of manufacturing a formed body for an electrode including in order: a first step of preparing an electrode material containing an electrode active material;

a second step of placing a shape retaining member having a rectangular tubular shape with rectangular opening portions, in which one end portion X of a pair of long side end portions of one opening portion L is present closer to the other opening portion M than the other end portion Y of the pair of long side end portions, with the opening portion L facing down so that an axial direction of the shape retaining member is parallel to a direction of gravitational force, and supplying the electrode material into the shape retaining member from the opening portion M of the shape retaining member; and a third step of discharging the electrode material in the shape retaining member onto a support from the opening portion L while relatively moving the opening portion L of the shape retaining member and the support along a short side direction of the opening portion L, to form a film of the electrode material on the support, in which in a case where a bulk density of the electrode material prepared in the first step is denoted by $D_1$ [g/cm$^3$] and a bulk density of the electrode material at the opening portion L of the shape retaining member is denoted by $D_2$ [g/cm$^3$], bulk density $D_2$/bulk density $D_1$=1.1 to 30 is satisfied, and in a case where a width of the opening portion L in the short side direction is denoted by $T_1$ [mm] and a distance between the end portion X of the opening portion L and the support is denoted by $T_2$ [mm], a relationship of width $T_1$>distance $T_2$ is satisfied.

<2> The method of manufacturing a formed body for an electrode according to <1>, in which the width $T_1$ and the distance $T_2$ satisfy width $T_1$/distance $T_2$=1.5 to 500.

<3> The method of manufacturing a formed body for an electrode according to <1> or <2>, in which the distance $T_2$ is 0.1 mm to 1.0 mm.

<4> The method of manufacturing a formed body for an electrode according to any one of <1> to <3>, in which the width $T_1$ is 1.5 mm to 50 mm.

<5> The method of manufacturing a formed body for an electrode according to any one of <1> to <4>, in which the bulk density $D_2$ is 0.55 g/cm$^3$ to 3.0 g/cm$^3$.

<6> The method of manufacturing a formed body for an electrode according to any one of <1> to <5>, in which the bulk density $D_1$ is 0.1 g/cm$^3$ to 0.5 g/cm$^3$.

<7> The method of manufacturing a formed body for an electrode according to any one of <1> to <6>, in which the bulk density $D_1$ and the bulk density $D_2$ satisfy bulk density $D_2$/bulk density $D_1$=1.5 to 20.

<8> The method of manufacturing a formed body for an electrode according to any one of <1> to <7>, in which in the second step, the electrode material is pressure-fed into the shape retaining member from the opening portion M of the shape retaining member by a pressure feed unit to supply the electrode material into the shape retaining member from the opening portion M of the shape retaining member.

According to an embodiment of the present disclosure, it is possible to provide a method of manufacturing a formed body for an electrode, in which a formed body for an electrode that is excellent in in-plane uniformity of a mass distribution can be manufactured.

DESCRIPTION OF THE PREFERRED EMBODIMENTS

Figure 1:
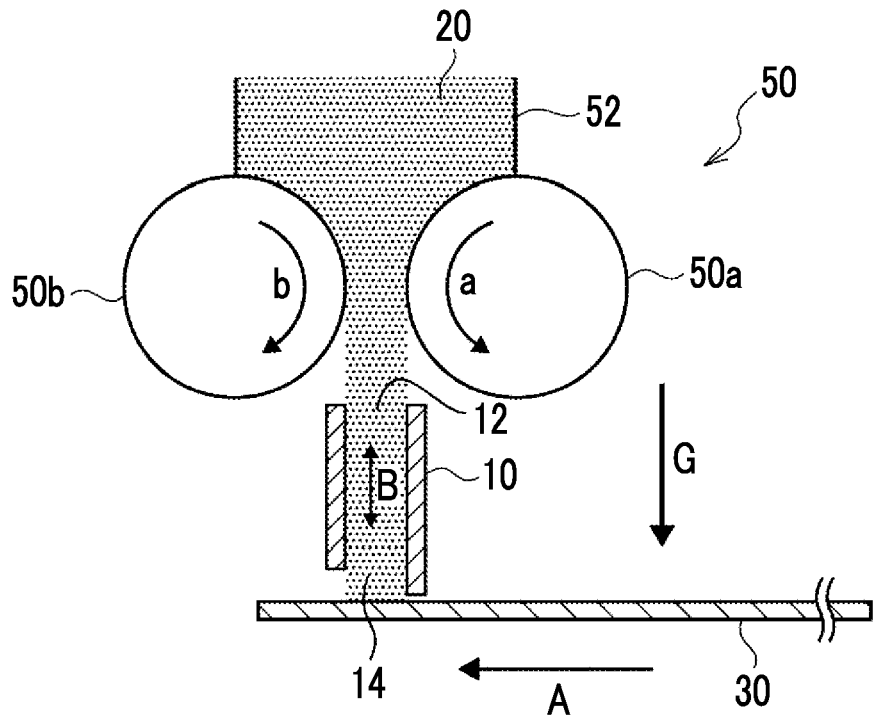
FIG. 1 is a schematic diagram illustrating an embodiment of a second step in a method of manufacturing a formed body for an electrode according to the present disclosure.

Hereinafter, embodiments of the present disclosure will be described with reference to the drawings. The present disclosure is not limited to the following embodiments, and may be implemented with appropriate changes within the scope of the object of the present disclosure. The constituent elements denoted by using the same references in the drawings mean that these are the same constituent elements. Descriptions of the overlapping constituent elements and references in the drawings may be omitted. The dimensional ratios in the drawings do not necessarily represent the actual dimensional ratio.

In the present disclosure, a numerical range expressed using "to" means a range including numerical values before and after "to" as a lower limit and an upper limit. In numerical ranges described in a stepwise manner in the present disclosure, an upper limit or a lower limit described in a certain numerical range may be substituted with an upper limit or a lower limit of another numerical range described in a stepwise manner. Furthermore, in a numerical range described in the present disclosure, an upper limit or a lower limit described in a certain numerical range may be substituted with a value shown in an example.

In the present disclosure, the term "step" includes not only an independent step but also cases where it cannot be clearly distinguished from other steps, so long as the desired effect of the step can be achieved.

In the present disclosure, "(meth)acrylic" means acrylic and/or methacrylic.

In the present disclosure, regarding the amount of each component in a composition, in a case where there are a plurality of substances corresponding to the component in the composition, the amount means a total amount of the plurality of substances present in the composition, unless otherwise specified.

In the present disclosure, "mass %" and "wt %" are synonymous, and "parts by mass" and "parts by weight" are synonymous.

In the present disclosure, a combination of two or more preferable aspects is a more preferable aspect.

In the present disclosure, the "solid content" means a component which does not disappear by volatilization or evaporation in a case where a drying treatment is performed on 1 g of a sample at 200° C. for 6 hours under a nitrogen atmosphere.

<Method of Manufacturing Formed Body for Electrode>

A method of manufacturing a formed body for an electrode according to the present disclosure includes in order: a first step of preparing an electrode material containing an electrode active material; a second step of placing a shape retaining member having a rectangular tubular shape with rectangular opening portions, in which one end portion X of a pair of long side end portions of one opening portion L is present closer to the other opening portion M than the other end portion Y of the pair of long side end portions, with the opening portion L facing down so that an axial direction of the shape retaining member is parallel to a direction of gravitational force, and supplying the electrode material into the shape retaining member from the other opening portion M of the shape retaining member; and a third step of discharging the electrode material in the shape retaining member onto a support from the opening portion L while relatively moving the opening portion L of the shape retaining member and the support along a short side direction of the opening portion L, to form a film of the electrode material on the support, in a case where a bulk density of the electrode material prepared in the first step is denoted by $D_1$ [g/cm$^3$] and a bulk density of the electrode material at the opening portion L of the shape retaining member is denoted by $D_2$ [g/cm$^3$], bulk density $D_2$/bulk density $D_1$=1.1 to 30 is satisfied, and in a case where a width of the opening portion L in the short side direction is denoted by $T_1$ [mm] and a distance between the end portion X of the opening portion L and the support is denoted by $T_2$ [mm], a relationship of width $T_1$>distance $T_2$ is satisfied.

In the present disclosure, both the "end portion X" and the "end portion Y" refer to the whole of the pair of long sides of the opening portion L, and are linear.

In addition, the shape retaining member having a rectangular tubular shape has a rectangular through hole as its shape indicates.

In the method of manufacturing a formed body for an electrode according to the present disclosure, a formed body for an electrode that is excellent in in-plane uniformity of a mass distribution can be manufactured. The reason why the method of manufacturing a formed body for an electrode according to the present disclosure produces the above effect is presumed as follows.

The method of manufacturing a formed body for an electrode according to the present disclosure includes the first step, the second step, and the third step described above.

That is, in the method of manufacturing a formed body for an electrode according to the present disclosure, a prepared electrode material is once supplied to the shape retaining member having a rectangular tubular shape, and the electrode material that has passed through the shape retaining member is discharged to the support.

In addition, the bulk density $D_1$ of the electrode material prepared in the first step and the bulk density $D_2$ of the electrode material at the opening portion L as a lower opening portion of the shape retaining member satisfy bulk density $D_2$/bulk density $D_1$=1.1 to 30. From this, it is presumed that the electrode material is compacted by the time it reaches the opening portion L of the shape retaining member, and is formed into a rectangular parallelepiped shape corresponding to the shape of the through hole of the shape retaining member. Accordingly, it is thought that the density distribution of the electrode material is adjusted at the opening portion L of the shape retaining member.

Then, the compacted electrode material is discharged from the opening portion L that is a discharge port of the shape retaining member to the support that is relatively moved along the short side direction of the opening portion L. In this case, the width $T_1$ of the opening portion L of the shape retaining member in the short side direction and the distance $T_2$ between the end portion X (that is, a side on the upstream side in a film forming direction among the sides of the opening portion L of the shape retaining member) of the opening portion L and the support satisfy the relationship of width $T_1$>distance $T_2$. Accordingly, the electrode material formed in the shape retaining member is subjected to film thickness regulation so that the thickness of the electrode material is small in a case where the electrode material is discharged to the support. It is thought that the electrode material is further compacted by regulating the film thickness, and the density distribution is made uniform.

From the above result, it is presumed that a formed body for an electrode that is excellent in in-plane uniformity of a mass distribution is manufactured in the method of manufacturing a formed body for an electrode according to the present disclosure.

Further, as described above, in a case where the film thickness is regulated in the third step, a formed body for an electrode having a target thickness is easily obtained.

[Bulk Density $D_1$ and Bulk Density $D_2$]

In the method of manufacturing a formed body for an electrode according to the present disclosure, in a case where a bulk density of the electrode material prepared in the first step is denoted by $D_1$ [g/cm$^3$] and a bulk density of the electrode material in the opening portion L of the shape retaining member is denoted by $D_2$ [g/cm$^3$], it is required to satisfy bulk density $D_2$/bulk density $D_1$=1.1 to 30.

In a case where the bulk density $D_1$ and the bulk density $D_2$ satisfy the above relationship, the density distribution of the electrode material discharged to the support can be adjusted, and it is possible to suppress clogging inside the shape retaining member, poor discharge to the support, and the like.

For the same reasons as above, the bulk density $D_1$ and the bulk density $D_2$ preferably satisfy bulk density $D_2$/bulk density $D_1$=1.5 to 20, more preferably satisfy bulk density $D_2$/bulk density $D_1$=2.0 to 10, and even more preferably satisfy bulk density $D_2$/bulk density $D_1$=4.0 to 10.

The bulk density $D_1$ may be set according to the type and amount of the electrode material to be used and the type and amount of other optional components, and is preferably 0.1 g/cm$^3$ to 0.5 g/cm$^3$, more preferably 0.20 g/cm$^3$ to 0.48 g/cm$^3$, and even more preferably 0.30 g/cm$^3$ to 0.45 g/cm$^3$.

From the viewpoint of formability of the electrode material in the shape retaining member and suppression of clogging inside the shape retaining member, poor discharge to the support, and the like, the bulk density $D_2$ is preferably 0.55 g/cm$^3$ to 3.0 g/cm$^3$, more preferably 0.7 g/cm$^3$ to 2.5 g/cm$^3$, and even more preferably 0.8 g/cm$^3$ to 2.0 g/cm$^3$.

As will be described later, the bulk density $D_1$ of the electrode material prepared in the first step is a value obtained by measuring the bulk density of the prepared electrode material.

In addition, the bulk density $D_2$ of the electrode material in the opening portion L of the shape retaining member is a value obtained in a manner that after stoppage of the movement of the shape retaining member and/or the support, the shape retaining member in a state in which the electrode material is discharged is separated from the support, and the bulk density of the electrode material that is present at a depth of 1 cm from the contact surface between the shape retaining member and the support is measured.

Here, the bulk density $D_1$ and the bulk density $D_2$ each are obtained by collecting a sample of a certain volume, measuring a weight of the collected sample, and dividing the measured weight [g] by the volume [cm$^3$] of the collected sample.

In the measurement of the bulk density $D_2$, first, as described above, after stoppage of the movement of the shape retaining member and/or the support, the shape retaining member in a state in which the electrode material is discharged is separated from the support, and the electrode material at a depth of 1 cm from the contact surface between the shape retaining member and the support is removed by a razor. Then, from the exposed surface, 1 cm$^3$ of the electrode material is cut out using a Thomson blade (one side of the blade is 1 cm long, square) with a frame shape that is 1 cm in the depth direction, and the weight [g] of the electrode material is measured by an electronic balance to obtain the bulk density $D_2$.

In the measurement of the bulk density $D_1$, regarding the electrode material prepared in the first step, 1 cm$^3$ of the electrode material is cut out from an optional position in the same manner as above, and the weight [g] of the electrode material is measured by an electronic balance to obtain the bulk density $D_1$.

[Width $T_1$ and Distance $T_2$]

In the method of manufacturing a formed body for an electrode according to the present disclosure, in a case where a width of the opening portion L in the short side direction is denoted by $T_1$ [mm] and a distance between the end portion X of the opening portion L and the support is denoted by $T_2$ [mm], it is required to satisfy a relationship of width $T_1$>distance $T_2$.

In a case where the width $T_1$ and the distance $T_2$ satisfy the above relationship, the film thickness of the electrode material is regulated in a case where the electrode material is discharged to the support, so that the electrode material is compacted. As a result, the density distribution of the electrode material discharged onto the support is made uniform.

For the same reasons as above, the width $T_1$ and the distance $T_2$ preferably satisfy the width $T_1$/distance $T_2$=1.5 to 500, more preferably satisfy width $T_1$/distance $T_2$=3.0 to 150, and even more preferably satisfy width $T_1$/distance $T_2$=10 to 100.

The width $T_1$ may be set according to the film thickness of the electrode material formed on the support, and is preferably 1.5 mm to 50 mm, more preferably 5 mm to 30 mm, and even more preferably 7.5 mm to 25 mm.

The distance $T_2$ may be set according to a target film thickness of a formed body for an electrode, and is preferably 0.1 mm to 1.0 mm, more preferably 0.2 mm to 0.9 mm, and even more preferably 0.3 to 0.8 mm.

Here, the width $T_1$ and the distance $T_2$ are measured using, for example, a digital caliper or a taper gauge.

The method of manufacturing a formed body for an electrode according to the present disclosure includes the first step, the second step, and the third step, and may further optionally have a fourth step of regulating the film thickness of the electrode material film on the support, a fifth step of placing a protective member on the formed electrode material film, and the like.

Hereinafter, the steps of the method of manufacturing a formed body for an electrode according to the present disclosure will be described.

[First Step]

The method of manufacturing a formed body for an electrode according to the present disclosure has the first step of preparing an electrode material.

In the present disclosure, "preparing an electrode material" means that the electrode material is made to be in a usable state, and includes preparing the electrode material unless otherwise specified. That is, in the first step, a pre-prepared electrode material or a commercially available electrode material may be prepared, or an electrode material may be prepared.

The electrode material prepared in the first step preferably contains an electrode active material, and has a composition satisfying the bulk density $D_1$ described above.

[Electrode Material]

The electrode material contains an electrode active material. The electrode material may optionally contain a component other than the electrode active material.

Hereinafter, components contained in the electrode material will be described.

(Electrode Active Material)

The electrode active material is a substance capable of inserting and releasing ions of metal elements belonging to Group 1 or 2 in the periodic table.

Examples of the electrode active material include positive electrode active materials and negative electrode active materials.

—Positive Electrode Active Material—

The positive electrode active material is not limited, and known active materials used for a positive electrode can be used. The positive electrode active material is preferably a positive electrode active material capable of reversibly inserting and releasing lithium ions.

Specific examples of the positive electrode active material include transition metal oxides and elements (for example, sulfur) that can be combined with lithium. Among the above examples, the positive electrode active material is preferably a transition metal oxide.

The transition metal oxide is preferably a transition metal oxide containing at least one transition metal element (hereinafter, referred to as "element Ma") selected from the group consisting of cobalt (Co), nickel (Ni), iron (Fe), manganese (Mn), copper (Cu), and vanadium (V).

In a case where the transition metal oxide contains Li and an element Ma, a molar ratio of Li to the element Ma (substance amount of Li/substance amount of element Ma) is preferably 0.3 to 2.2. In the present disclosure, the "substance amount of element Ma" refers to a total substance amount of all elements corresponding to the element Ma.

In addition, the transition metal oxide may contain at least one transition metal element (hereinafter, referred to as "element Mb") selected from the group consisting of Group 1 elements other than lithium, Group 2 elements, aluminum (Al), gallium (Ga), indium (In), germanium (Ge), tin (Sn), lead (Pb), antimony (Sb), bismuth (Bi), silicon (Si), phosphorus (P), and boron (B). The content of the element Mb (that is, a total content of all elements corresponding to the element Mb) is preferably 0 mol % to 30 mol % with respect to the substance amount of the element Ma.

Examples of the transition metal oxide include transition metal oxides having a bedded salt-type structure, transition metal oxides having a spinel-type structure, lithium-containing transition metal phosphate compounds, lithium-containing transition metal halogenated phosphate compounds, and lithium-containing transition metal silicate compounds.

Examples of the transition metal oxides having a bedded salt-type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Examples of the transition metal oxides having a spinel-type structure include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds include olivine-type iron phosphate salts (for example, $LiFePO_4$ and $Li_3Fe_2(PO_4)_3$), iron pyrophosphate salts (for example, $LiFeP_2O_7$), cobalt phosphate salts (for example, $LiCoPO_4$), and monoclinic nasicon-type vanadium phosphate salts (for example, $Li_3V_2(PO_4)_3$ (lithium vanadium phosphate)).

Examples of the lithium-containing transition metal halogenated phosphate compounds include fluorinated iron phosphate salts (for example, $Li_2FePO_4F$), fluorinated manganese phosphate salts (for example, $Li_2MnPO_4F$), and fluorinated cobalt phosphate salts (for example, $Li_2CoPO_4F$).

Examples of the lithium-containing transition metal silicate compounds include $Li_2FeSiO_4$, $Li_2MnSiO_4$, and $Li_2CoSiO_4$.

The transition metal oxide is preferably a transition metal oxide having a bedded salt-type structure, and more preferably at least one compound selected from the group consisting of $LiCoO_2$ (lithium cobalt oxide [LCO]), $LiNi_{0.85}Co_{0.10}Al_{0.05}O_2$ (lithium nickel cobalt aluminum oxide [NCA]), and $LiNi_{1/3}Co_{1/3}Mn_{1/3}O_2$ (lithium nickel manganese cobalt oxide [NMC]).

The positive electrode active material may be a commercially available product or a synthetic product manufactured by a known method (for example, a firing method). For example, a positive electrode active material obtained by the firing method may be washed with water, an acidic aqueous solution, an alkaline aqueous solution, or an organic solvent.

The composition of the positive electrode active material is measured using inductive coupling plasma (ICP) emission spectrometric analysis.

The shape of the positive electrode active material is not limited, and is preferably a particulate shape from the viewpoint of handleability.

The volume average particle diameter of the positive electrode active material is not limited, and may be, for example, 0.1 µm to 50 µm. The volume average particle diameter of the positive electrode active material is preferably 0.3 µm to 40 µm, and more preferably 0.5 µm to 30 µm.

In a case where the volume average particle diameter of the positive electrode active material is 0.3 µm or more, it is possible to easily form an aggregate of the electrode material, and it is possible to suppress the scattering of the electrode material during handling. In a case where the volume average particle diameter of the positive electrode active material is 40 µm or less, it is possible to easily adjust the thickness of a formed body for an electrode, and it is possible to suppress the generation of voids during the course of forming.

The volume average particle diameter of the positive electrode active material is measured by the following method.

A dispersion liquid containing 0.1 mass % of the positive electrode active material is prepared by mixing the positive electrode active material with a solvent (for example, heptane, octane, toluene, or xylene). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the positive electrode active material. For other detailed conditions, refer to "JIS Z 8828: 2013" as necessary.

Examples of the method of adjusting the particle diameter of the positive electrode active material include a method using a pulverizer or a classifier.

The electrode material may contain one kind of positive electrode active material alone, or two or more kinds of positive electrode active materials.

The content of the positive electrode active material is preferably 10 mass % to 95 mass %, more preferably 30 mass % to 90 mass %, even more preferably 50 mass % to 85 mass %, and particularly preferably 60 mass % to 80 mass % with respect to the total solid content mass of the electrode material.

—Negative Electrode Active Material—

The negative electrode active material is not limited, and known active materials used for a negative electrode can be used. The negative electrode active material is preferably a negative electrode active material capable of reversibly inserting and releasing lithium ions.

Examples of the negative electrode active material include carbonaceous materials, metal oxides (for example, tin oxide), silicon oxides, metal composite oxides, lithium single bodies, lithium alloys (for example, lithium aluminum alloy), and metals (for example, Sn, Si, and In) that can form an alloy with lithium. Among the above examples, the negative electrode active material is preferably a carbonaceous material or a lithium composite oxide from the viewpoint of reliability.

The carbonaceous material is substantially a material consisting of carbon.

Examples of the carbonaceous material include carbonaceous materials obtained by firing petroleum pitch, carbon black (for example, acetylene black), graphite (for example, natural graphite and artificial graphite (for example, vapor-grown graphite)), hard carbon, or synthetic resins (for example, polyacrylonitrile (PAN) and furfuryl alcohol resin). Examples of the carbonaceous material also include carbon fibers (for example, polyacrylonitrile-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and activated carbon fibers). Examples of the graphite include mesophase microspheres, graphite whisker, and flat graphite.

In the present disclosure, "flat" means a shape having two principal planes facing in opposite directions.

The metal composite oxide is preferably a metal composite oxide capable of storing and releasing lithium.

The metal composite oxide capable of storing and releasing lithium preferably contains at least one element selected from the group consisting of titanium and lithium from the viewpoint of high current density charging and discharging characteristics.

The metal oxide and the metal composite oxide are particularly preferably amorphous oxides. Here, "amorphous" means a substance having a broad scattering band having a peak at 20° to 40° in terms of 2θ in an X-ray diffraction method using CuKα rays. The amorphous oxide may have a crystalline diffraction line. In the amorphous oxide, the highest intensity of the crystalline diffraction lines observed at 40° to 70° in terms of 2θ is preferably 100 times or less, and more preferably 5 times or less the intensity of a diffraction line having a peak in a broad scattering band observed at 20° to 40° in terms of 2θ. The amorphous oxide particularly preferably has no crystalline diffraction line.

The metal oxide and the metal composite oxide are also preferably chalcogenides. A chalcogenide is a reaction product of a metal element and an element of Group 16 in the periodic table.

Among the compound group consisting of amorphous oxides and chalcogenides, amorphous oxides and chalcogenides of metalloid elements are preferable, and oxides and chalcogenides containing at least one element selected from the group consisting of elements of Groups 13 to 15 in the periodic table, Al, Ga, Si, Sn, Ge, Pb, Sb, and Bi are more preferable.

Preferable examples of the amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, the above-described compound may be a composite oxide with lithium (for example, $Li_2SnO_2$).

The negative electrode active material preferably further contains titanium. The negative electrode active material containing titanium is preferably $Li_4Ti_5O_{12}$ (lithium titanate [LTO]) from the viewpoint that it has excellent high-speed charging and discharging characteristics since the volume thereof changes only to a small extent during the storing and release of lithium ions, and the life of the lithium ion secondary battery can be improved due to the suppression of deterioration of the electrode.

The negative electrode active material may be a commercially available product or a synthetic product manufactured by a known method (for example, a firing method). For example, a negative electrode active material obtained by the firing method may be washed using water, an acidic aqueous solution, an alkaline aqueous solution, or an organic solvent.

For example, CGB20 (Nippon Graphite Industries, Co., Ltd.) is available as the negative electrode active material.

The composition of the negative electrode active material is measured using inductive coupling plasma (ICP) emission spectrometric analysis.

The shape of the negative electrode active material is not limited, and is preferably a particulate shape from the viewpoint of easy handling and easy control of uniformity during mass production.

The volume average particle diameter of the negative electrode active material is preferably 0.1 μm to 60 μm, more preferably 0.3 μm to 50 μm, and particularly preferably 0.5 μm to 40 μm.

In a case where the volume average particle diameter of the negative electrode active material is 0.1 μm or more, it is possible to easily form an aggregate of the electrode material, and it is possible to suppress the scattering of the electrode material during handling. In a case where the volume average particle diameter of the negative electrode active material is 60 μm or less, it is possible to easily adjust the thickness of a formed body for an electrode, and it is possible to suppress the generation of voids during the course of forming.

The volume average particle diameter of the negative electrode active material is measured by a method equivalent to the method of measuring the volume average particle diameter of the positive electrode active material.

Examples of the method of adjusting the particle diameter of the negative electrode active material include a method using a pulverizer or a classifier. In the above-described method, for example, a mortar, a ball mill, a sand mill, a vibrating ball mill, a satellite ball mill, a planetary ball mill, a swirling airflow-type jet mill, or a sieve is suitably used. In the pulverization of the negative electrode active material, wet pulverization using water or an organic solvent (for example, methanol) can also be optionally performed. The method of adjusting to a desired particle diameter is preferably classification. In the classification, for example, a sieve or a wind power classifier can be used. The classification may be performed in a dry manner or in a wet manner.

In a case where an amorphous oxide containing Sn, Si, or Ge is used as the negative electrode active material, preferable examples of the negative electrode active material that can be used in combination with the above-described amorphous oxide include carbon materials capable of storing and releasing lithium ions or a lithium metal, lithium, lithium alloys, and metals capable of being alloyed with lithium.

The electrode material may contain one kind of negative electrode active material alone, or two or more kinds of negative electrode active materials.

The content of the negative electrode active material is preferably 10 mass % to 80 mass %, more preferably 20 mass % to 80 mass %, even more preferably 30 mass % to 80 mass %, and particularly preferably 40 mass % to 75 mass % with respect to the total solid content mass of the electrode material.

The surface of each of the positive electrode active material and the negative electrode active material may be coated with a surface coating agent. Examples of the surface coating agent include metal oxides containing Ti, Nb, Ta, W, Zr, Si, or Li. Examples of the metal oxides include titanate spinels, tantalum-based oxides, niobium-based oxides, and lithium niobate-based compounds. Specific examples of the compounds include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, and $LiBO_2$.

(Inorganic Solid Electrolyte)

The electrode material preferably contains an inorganic solid electrolyte from the viewpoint of an improvement in battery performance (for example, discharge capacity and output characteristics).

Here, the "solid electrolyte" means a solid-state electrolyte in which ions can move inside thereof.

Since the inorganic solid electrolyte is not an electrolyte containing an organic substance as a principal ion-conductive material, it is clearly differentiated from organic solid electrolytes (for example, polymer electrolytes represented by polyethylene oxide (PEO), and organic electrolyte salts represented by lithium bis(trifluoromethanesulfonyl)imide (LiTFSI)). In addition, since the inorganic solid electrolyte is solid at steady state, it is not dissociated or liberated into cations or anions. Therefore, the inorganic solid electrolyte is also clearly differentiated from inorganic electrolyte salts (for example, $LiPF_6$, $LiBF_4$, lithium bis(fluoroulfonyl)imide (LiFSI), and LiCl) that are dissociated or liberated into cations or anions in electrolytic solutions or polymers.

The inorganic solid electrolyte is not limited as long as it is an inorganic solid electrolyte having ion conductivity of a metal element belonging to Group 1 or 2 in the periodic table, and generally does not have electron conductivity.

In a case where a formed body for an electrode obtained by the method of manufacturing a formed body for an electrode according to the present disclosure is used for a lithium ion battery, the inorganic solid electrolyte preferably has lithium ion conductivity.

Examples of the inorganic solid electrolyte include sulfide-based inorganic solid electrolytes and oxide-based inorganic solid electrolytes. Among the above examples, the inorganic solid electrolyte is preferably a sulfide-based inorganic solid electrolyte from the viewpoint that a good interface can be formed between the active material and the inorganic solid electrolyte.

—Sulfide-Based Inorganic Solid Electrolyte—

The sulfide-based inorganic solid electrolyte preferably contains a sulfur atom (S), has ion conductivity of a metal element belonging to Group 1 or 2 in the periodic table, and has an electron-insulating property.

The sulfide-based inorganic solid electrolyte more preferably contains at least Li, S, and P, and has lithium ion conductivity. The sulfide-based inorganic solid electrolyte may optionally contain an element other than Li, S, and P.

Examples of the sulfide-based inorganic solid electrolyte include an inorganic solid electrolyte having a composition represented by Formula (A).

$$L_{a1}M_{b1}P_{c1}S_{d1}A_{e1}: \hspace{2cm} \text{Formula (A)}$$

In Formula (A), L represents at least one element selected from the group consisting of Li, Na, and K, and is preferably Li.

In Formula (A), M represents at least one element selected from the group consisting of B, Zn, Sn, Si, Cu, Ga, Sb, Al, and Ge, and is preferably B, Sn, Si, Al, or Ge, and more preferably Sn, Al, or Ge.

In Formula (A), A represents at least one element selected from the group consisting of I, Br, Cl, and F, and is preferably I or Br, and more preferably I.

In Formula (A), a1 represents 1 to 12, and is preferably 1 to 9, and more preferably 1.5 to 4.

In Formula (A), b1 represents 0 to 1, and is more preferably 0 to 0.5.

In Formula (A), c1 represents 1.

In Formula (A), d1 represents 2 to 12, and is preferably 3 to 7, and more preferably 3.25 to 4.5.

In Formula (A), e1 represents 0 to 5, and is preferably 0 to 3, and more preferably 0 to 1.

In Formula (A), it is preferable that b1 and e1 are 0, it is more preferable that b1 and e1 are 0, and a proportion of a1, c1, and d1 (that is, a1:c1:d1) is 1 to 9:1:3 to 7, and it is particularly preferable that b1 and e1 are 0, and a proportion of a1, c1, and d1 (that is, a1:c1:d1) is 1.5 to 4:1:3.25 to 4.5.

The compositional ratio of each element can be controlled by, for example, adjusting an amount of the raw material compound to be blended in the manufacturing of the sulfide-based inorganic solid electrolyte.

The sulfide-based inorganic solid electrolyte may be amorphous (glass) or crystallized (glass ceramics), or only partially crystallized. Examples of the sulfide-based inorganic solid electrolyte described above include Li—P—S-based glass containing Li, P, and S, and Li—P—S-based glass ceramics containing Li, P, and S. Among the above examples, the sulfide-based inorganic solid electrolyte is preferably Li—P—S-based glass.

The lithium ion conductivity of the sulfide-based inorganic solid electrolyte is preferably $1\times10^{-4}$ S/cm or more, and more preferably $1\times10^{-3}$ S/cm or more. The upper limit of the lithium ion conductivity of the sulfide-based inorganic solid electrolyte is not limited, and for example, substantially $1\times10^{-1}$ S/cm or less.

The sulfide-based inorganic solid electrolyte can be manufactured by, for example, (1) a reaction of lithium sulfide ($Li_2S$) and phosphorus sulfide (for example, diphosphorus pentasulfide ($P_2S_5$)), (2) a reaction of lithium sulfide and at least one of a phosphorus single body or a sulfur single body, or (3) a reaction of lithium sulfide, phosphorus sulfide (for example, diphosphorus pentasulfide ($P_2S_5$)), and at least one of a phosphorus single body or a sulfur single body.

The molar ratio of $Li_2S$ to $P_2S_5$ ($Li_2S$:$P_2S_5$) in the manufacturing of the Li—P—S-based glass and the Li—P—S-based glass ceramics is preferably 65:35 to 85:15, and more preferably 68:32 to 77:23. By setting the molar ratio of $Li_2S$ to $P_2S_5$ within the above range, lithium ion conductivity can be further increased.

Examples of the sulfide-based inorganic solid electrolyte include a compound formed of a raw material composition containing $Li_2S$ and a sulfide of an element of Groups 13 to 15.

Examples of the raw material composition include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among the above examples, the raw material composition is preferably $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$, and more preferably $Li_2S$—$P_2S_5$, $Li_{10}GeP_2S_{12}$, or $Li_2S$—$P_2S_5$—$SiS_2$ from the viewpoint of high lithium ion conductivity.

Examples of the method of manufacturing the sulfide-based inorganic solid electrolyte using the above-described raw material composition include an amorphorization method.

Examples of the amorphorization method include a mechanical milling method and a melting quenching method. Among the above examples, a mechanical milling method is preferable from the viewpoint that the treatment can be performed at normal temperature and the manufacturing process can be simplified.

—Oxide-Based Inorganic Solid Electrolyte—

The oxide-based inorganic solid electrolyte preferably contains an oxygen atom (O), has ion conductivity of a metal element belonging to Group 1 or Group 2 in the periodic table, and has an electron-insulating property.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit of the ion conductivity of the oxide-based inorganic solid electrolyte is not limited, and for example, substantially $1\times10^{-1}$ S/cm or less.

Examples of the oxide-based inorganic solid electrolyte include the following compounds. However, the oxide-based inorganic solid electrolyte is not limited to the following compounds.

(1) $Li_{xa}La_{ya}TiO_3$ (hereinafter, referred to as "LLT". xa satisfies $0.3 \leq xa \leq 0.7$ and ya satisfies $0.3 \leq ya \leq 0.7$)

(2) $Li_{xb}La_{yb}Zr_{zb}M^{bb}_{mb}O_{nb}$ ($M^{bb}$ is at least one element selected from the group consisting of Al, Mg, Ca, Sr, V, Nb, Ta, $T_1$, Ge, In, and Sn. xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$)

(3) $Li_{xc}B_{yc}M^{cc}_{zc}O_{nc}$ ($M^{cc}$ is at least one element selected from the group consisting of C, S, Al, Si, Ga, Ge, In, and Sn. xc satisfies $0 \leq xc \leq 5$, yc satisfies $0 \leq yc \leq 1$, zc satisfies $0 \leq zc \leq 1$, and nc satisfies $0 \leq nc \leq 6$)

(4) $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$)

(5) $Li_{(3-2xe)}M^{ee}_{xe}D^{ee}O$ (xe satisfies $0 \leq xe \leq 0.1$, $M^{ee}$ represents a divalent metal atom, and $D^{ee}$ represents a halogen atom or a combination of two or more halogen atoms)

(6) $Li_{xf}Si_{yf}O_{zf}$ (xf satisfies $1 \leq xf \leq 5$, yf satisfies $0 < yf \leq 3$, and zf satisfies $1 \leq zf \leq 10$)

(7) $Li_{xg}S_{yg}O_{zg}$ (xg satisfies $1 \leq xg \leq 3$, yg satisfies $0 < yg \leq 2$, and zg satisfies $1 \leq zg \leq 10$)

(8) $Li_3BO_3$ (9) $Li_3BO_3$—$Li_2SO_4$

(10) $Li_2O$—$B_2O_3$—$P_2O_5$

(11) $Li_2O$—$SiO_2$

(12) $Li_6BaLa_2Ta_2O_{12}$

(13) $Li_3PO_{(4-3/2w)}N_w$ (w satisfies $w<1$)

(14) $Li_{3.5}Zn_{0.25}GeO_4$ having a lithium super ionic conductor (LISICON)-type crystal structure

(15) $La_{0.55}Li_{0.35}TiO_3$ having a perovskite-type crystal structure

(16) $LiTi_2P_3O_{12}$ having a natrium super ionic conductor (NASICON)-type crystal structure

(17) $Li_{1+xh+yh}(Al, Ga)_{xh}(Ti, Ge)_{2-xh}Si_{yh}P_{3-yh}O_{12}$ (xh satisfies $0 \leq xh \leq 1$ and yh satisfies $0 \leq yh \leq 1$)

(18) $Li_7La_3Zr_2O_{12}$ having a garnet-type crystal structure (hereinafter, referred to as "LLZ")

As the oxide-based inorganic solid electrolyte, phosphorus compounds containing Li, P, and O are also preferable. Examples of the phosphorus compounds containing Li, P, and O include lithium phosphate ($Li_3PO_4$), LiPON in which a part of oxygen of lithium phosphate is substituted with nitrogen, and LiPOD1 ($D_1$ is at least one element selected from the group consisting of Ti, V, Cr, Mn, Fe, Co, Ni, Cu, Zr, Nb, Mo, Ru, Ag, Ta, W, Pt, and Au).

As the oxide-based inorganic solid electrolyte, LiAlON (Al is at least one element selected from the group consisting of Si, B, Ge, Al, C, and Ga) is also preferable.

Among the above examples, the oxide-based inorganic solid electrolyte is preferably LLT, $Li_{xb}La_{yb}Zr_{zb}M^{bb}_{mb}O_{nb}$ ($M^{bb}$, xb, yb, zb, mb, and nb are as described above), LLZ, $Li_3BO_3$, $Li_3BO_3$—$Li_2SO_4$, or $Li_{xd}(Al, Ga)_{yd}(Ti, Ge)_{zd}Si_{ad}P_{md}O_{nd}$ (xd, yd, zd, ad, md, and nd are as described above), more preferably LLT, LLZ, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$), and particularly preferably LLZ.

The inorganic solid electrolyte preferably has a particulate shape.

The volume average particle diameter of the inorganic solid electrolyte is preferably 0.01 µm or more, and more preferably 0.1 µm or more. The upper limit of the volume average particle diameter of the inorganic solid electrolyte is preferably 100 μm or less, and more preferably 50 μm or less.

The volume average particle diameter of the inorganic solid electrolyte is measured by the following method.

A dispersion liquid containing 1 mass % of the inorganic solid electrolyte is prepared by mixing the inorganic solid electrolyte with water (heptane in a case where the volume average particle diameter of a substance unstable to water is measured). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the inorganic solid electrolyte. For other detailed conditions, refer to "JIS Z 8828: 2013" as necessary.

The electrode material may contain one kind of inorganic solid electrolyte alone, or two or more kinds of inorganic solid electrolytes.

In a case where the electrode material contains an inorganic solid electrolyte, the content of the inorganic solid electrolyte is preferably 1 mass % or more, more preferably 5 mass % or more, and particularly preferably 10 mass % or more with respect to the total solid content mass of the electrode material from the viewpoint of reduction of interface resistance and a battery characteristic maintaining effect (for example, improvement in cycle characteristics). From the same viewpoint, the upper limit of the content of the inorganic solid electrolyte is preferably 90 mass % or less, more preferably 70 mass % or less, and particularly preferably 50 mass % or less with respect to the total solid content mass of the electrode material.

(Binder)

The electrode material preferably contains a binder from the viewpoint of an improvement in adhesiveness between the electrode materials. The binder is not limited as long as it is an organic polymer, and known binders used as a binder in a positive electrode or a negative electrode of the battery material can be used. Examples of the binder include fluorine-containing resins, hydrocarbon-based thermoplastic resins, acrylic resins, and urethane resins.

Examples of the fluorine-containing resins include polytetrafluoroethylene (PTFE), polyvinylene difluoride (PVdF), and a copolymer of polyvinylene difluoride and hexafluoropropylene (PVdF-HFP).

Examples of the hydrocarbon-based thermoplastic resins include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resins include methyl poly(meth)acrylate, ethyl poly(meth)acrylate, isopropyl poly(meth)acrylate, isobutyl poly(meth)acrylate, butyl poly(meth)acrylate, hexyl poly(meth)acrylate, octyl poly(meth)acrylate, dodecyl poly(meth)acrylate, stearyl poly(meth)acrylate, 2-hydroxyethyl poly(meth)acrylate, poly(meth)acrylate, benzyl poly(meth)acrylate, glycidyl poly(meth)acrylate, dimethylaminopropyl poly(meth)acrylate, and copolymers of monomers forming the above resins.

Examples of the binder also include copolymers of vinyl-based monomers.

Examples of the copolymers of vinyl-based monomers include a methyl (meth)acrylate-styrene copolymer, a methyl (meth)acrylate-acrylonitrile copolymer, and a butyl (meth)acrylate-acrylonitrile-styrene copolymer.

The weight-average molecular weight of the binder is preferably 10,000 or more, more preferably 20,000 or more, and particularly preferably 50,000 or more.

The upper limit of the weight-average molecular weight of the binder is preferably 1,000,000 or less, more preferably 200,000 or less, and particularly preferably 100,000 or less.

The moisture concentration in the binder is preferably 100 ppm or less on a mass basis.

The metal concentration in the binder is preferably 100 ppm or less on a mass basis.

The electrode material may contain one kind of binder alone, or two or more kinds of binders.

In a case where the electrode material contains a binder, the content of the binder is preferably 0.01 mass % or more, more preferably 0.1 mass % or more, and particularly preferably 1 mass % or more with respect to the total solid content mass of the electrode material from the viewpoint of reduction of interface resistance and maintaining of the reduction. The upper limit of the content of the binder is preferably 10 mass % or less, more preferably 5 mass % or less, and particularly preferably 3 mass % or less with respect to the total solid content mass of the electrode material from the viewpoint of battery performance.

In a case where the electrode material contains an electrode active material, an inorganic solid electrolyte, and a binder, a ratio of the total mass of the active material and the inorganic solid electrolyte to the mass of the binder ([mass of active material+mass of inorganic solid electrolyte]/[mass of the binder]) is preferably 1,000 to 1, more preferably 500 to 2, and particularly preferably 100 to 10.

(Conductive Auxiliary Agent)

The electrode material preferably contains a conductive auxiliary agent from the viewpoint of an improvement in electron conductivity of the active material. The conductive auxiliary agent is not limited, and known conductive auxiliary agents can be used. In particular, in a case where the electrode material contains a positive electrode active material, the electrode material preferably contains a conductive auxiliary agent.

Examples of the conductive auxiliary agent include graphite (for example, natural graphite and artificial graphite), carbon black (for example, acetylene black, Ketjen black, and furnace black), amorphous carbon (for example, needle coke), carbon fibers (for example, vapor-grown carbon fibers and carbon nanotubes), other carbonaceous materials (for example, graphene and fullerene), metal powders (for example, a copper powder and a nickel powder), metal fibers (for example, copper fibers and nickel fibers), and conductive polymers (for example, polyaniline, polypyrrole, polythiophene, polyacetylene, and polyphenylene derivatives).

Among the above examples, the conductive auxiliary agent is preferably at least one conductive auxiliary agent selected from the group consisting of carbon fibers and metal fibers.

Examples of the shape of the conductive auxiliary agent include a fibrous shape, an acicular shape, a tubular shape, a dumbbell shape, a disk shape, and an oval spherical shape.

Among the above examples, the shape of the conductive auxiliary agent is preferably a fibrous shape from the viewpoint of an improvement in electron conductivity of the active material.

The aspect ratio of the conductive auxiliary agent is preferably 1.5 or more, and more preferably 5 or more. In a case where the aspect ratio of the conductive auxiliary agent is 1.5 or more, the electron conductivity of the electrode active material can be improved, and thus the output characteristics of the battery can be improved.

The aspect ratio of the conductive auxiliary agent is preferably 10,000 or less, more preferably 5,000 or less, and particularly preferably 1,000 or less. Furthermore, the aspect ratio of the conductive auxiliary agent is preferably 500 or less, more preferably 300 or less, and particularly preferably 100 or less. In a case where the aspect ratio of the conductive auxiliary agent is 10,000 or less, the dispersibility of the conductive auxiliary agent can be improved, and a short circuit due to the conductive auxiliary agent penetrating a formed body for an electrode can be efficiently prevented.

The aspect ratio of the conductive auxiliary agent is measured by the following method. SEM images of three optional visual fields taken at 1,000 to 3,000-fold observation magnification using a scanning electron microscope (SEM) (for example, XL30 manufactured by Koninklijke Philips N.V.) are converted to bitmap (BMP) files. Images of 50 particles of the conductive auxiliary agent are imported using image analysis software (for example, "A-ZOKUN" that is an integrated application of IP-1000PC manufactured by Asahi Engineering Co., Ltd.). A maximum length and a minimum length of each of the particles of the conductive auxiliary agent are read in a state in which the particles of the conductive auxiliary agent are observed without being overlapped. The "maximum length of the conductive auxiliary agent" means the length (that is, major axis length) of a line segment having the maximum length among line segments from a certain point to another point on the outer circumference of the conductive auxiliary agent particle. The "minimum length of the conductive auxiliary agent" means the length (that is, minor axis length) of a line segment having the minimum length among line segments from a certain point to another point on the outer circumference of the conductive auxiliary agent particle, which are orthogonal to the line segment having the maximum value. An average (A) of 40 points excluding upper 5 points and lower 5 points among the maximum lengths (major axis lengths) of the 50 particles of the conductive auxiliary agent is obtained. Next, an average (B) of 40 points excluding upper 5 points and lower 5 points among the minimum lengths (minor axis lengths) of the 50 particles of the conductive auxiliary agent is obtained. The aspect ratio of the conductive auxiliary agent is calculated by dividing the average (A) by the average (B).

The minor axis length of the conductive auxiliary agent is preferably 10 μm or less, more preferably 8 μm or less, and particularly preferably 5 μm or less.

The minor axis length of the conductive auxiliary agent is preferably 1 nm or more, more preferably 3 nm or more, and particularly preferably 5 nm or more.

The minor axis length of the conductive auxiliary agent is the minimum length of each of 50 particles of the conductive auxiliary agent calculated in the method of measuring the aspect ratio of the conductive auxiliary agent.

The average minor axis length of the conductive auxiliary agent is preferably 8 μm or less, more preferably 5 μm or less, and particularly preferably 3 μm or less.

The average minor axis length of the conductive auxiliary agent is preferably 1 nm or more, more preferably 2 nm or more, and particularly preferably 3 nm or more.

The average minor axis length of the conductive auxiliary agent is an average of the minor axis lengths of the particles of the conductive auxiliary agent, excluding upper 10% (that is, upper 5 points) and lower 10% (that is, lower 5 points) of the minimum lengths (minor axis lengths) of 50 particles of the conductive auxiliary agent calculated in the method of measuring the aspect ratio of the conductive auxiliary agent.

The electrode material may contain one kind of conductive auxiliary agent alone, or two or more kinds of conductive auxiliary agents.

In a case where the electrode material contains a conductive auxiliary agent, the content of the conductive auxiliary agent is preferably more than 0 mass % and 10 mass % or less, more preferably 0.5 mass % to 8 mass %, and particularly preferably 1 mass % to 7 mass % with respect to the total solid content mass of the electrode material from the viewpoint of an improvement in electron conductivity of the active material.

(Lithium Salt)

The electrode material preferably contains a lithium salt from the viewpoint of an improvement in battery performance. The lithium salt is not limited, and known lithium salts can be used.

As the lithium salt, the lithium salts described in paragraphs 0082 to 0085 of JP2015-088486A are preferable.

The electrode material may contain one kind of lithium salt alone, or two or more kinds of lithium salts.

In a case where the electrode material contains a lithium salt, the content of the lithium salt is preferably 0.1 mass % to 10 mass % with respect to the total solid content mass of the electrode material.

(Dispersant)

The electrode material preferably contains a dispersant. In a case where the electrode material contains a dispersant, it is possible to suppress the aggregation in a case where the concentration of any one of the electrode active material or the inorganic solid electrolyte is high.

The dispersant is not limited, and known dispersants can be used. The dispersant is preferably a compound consisting of low molecules of a molecular weight of 200 or more and less than 3,000 or oligomers, and having at least one functional group selected from the following functional group (I) and an alkyl group having 8 or more carbon atoms or an aryl group having 10 or more carbon atoms in the same molecule.

The functional group (I) includes at least one functional group selected from the group consisting of an acidic group, a group having a basic nitrogen atom, a (meth)acryloyl group, a (meth)acrylamide group, an alkoxysilyl group, an epoxy group, an oxetanyl group, an isocyanate group, a cyano group, a sulfanyl group, and a hydroxy group, and is preferably a group consisting of an acidic group, a group having a basic nitrogen atom, an alkoxysilyl group, a cyano group, a sulfanyl group, and a hydroxy group, and more preferably a group consisting of a carboxy group, a sulfonic acid group, a cyano group, an amino group, and a hydroxy group.

The electrode material may contain one kind of dispersant alone, or two or more kinds of dispersants.

In a case where the electrode material contains a dispersant, the content of the dispersant is preferably 0.2 mass % to 10 mass %, and more preferably 0.5 mass % to 5 mass % with respect to the total solid content mass of the electrode material from the viewpoint that both the prevention of aggregation and the battery performance are achieved.

(Liquid Component)

The electrode material may contain a liquid component. Examples of the liquid component include an electrolytic solution.

The electrolytic solution is not limited, and known electrolytic solutions can be used. Examples of the electrolytic solution include an electrolytic solution containing an electrolyte and a solvent. Specific examples of the electrolytic solution include an electrolytic solution containing a lithium salt compound as an electrolyte and a carbonate compound as a solvent.

Examples of the lithium salt compound include lithium hexafluorophosphate. The electrolytic solution may contain one kind of lithium salt compound alone, or two or more kinds of lithium salt compounds.

Examples of the carbonate compound include ethyl methyl carbonate, ethylene carbonate, and propylene carbonate. The electrolytic solution may contain one kind of carbonate compound alone, or two or more kinds of carbonate compounds.

Examples of the electrolyte contained in the electrolytic solution include the materials described in the above section "Inorganic Solid Electrolyte".

As a component of the electrolytic solution, for example, an ionic liquid may be used. The ionic liquid may be used as an electrolyte or a solvent.

The content of the electrolytic solution in the electrode material is preferably 30 mass % or less, more preferably 20 mass % or less, and particularly preferably 15 mass % or less with respect to the total mass of the electrode material. In a case where the content of the electrolytic solution in the electrode material is 30 mass % or less, it is possible to suppress the oozing of the electrolytic solution during the forming of the electrode material.

The lower limit of the content of the electrolytic solution in the electrode material is preferably 0.01 mass % or more, and more preferably 0.1 mass % or more with respect to the total mass of the electrode material from the viewpoint of an improvement in battery performance.

The electrode material may contain, as a liquid component, a solvent other than the solvent contained as a component of the electrolytic solution (hereinafter, also simply referred to as "solvent"). Examples of the solvent include alcohol compound solvents, ether compound solvents, amide compound solvents, amino compound solvents, ketone compound solvents, aromatic compound solvents, aliphatic compound solvents, and nitrile compound solvents.

Examples of the alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound solvents include alkylene glycol alkyl ether (for example, ethylene glycol monomethyl ether, ethylene glycol monobutyl ether, diethylene glycol, dipropylene glycol, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and diethylene glycol monobutyl ether), dimethyl ether, diethyl ether, diisopropyl ether, dibutyl ether, tetrahydrofuran, and dioxane.

Examples of the amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide.

Examples of the amino compound solvents include triethylamine, diisopropylethylamine, and tributylamine.

Examples of the ketone compound solvents include acetone, methyl ethyl ketone, methyl isobutyl ketone, and cyclohexanone.

Examples of the aromatic compound solvents include benzene, toluene, and xylene.

Examples of the aliphatic compound solvents include hexane, heptane, octane, and decane.

Examples of the nitrile compound solvents include acetonitrile, propionitrile, and isobutyronitrile.

The solvent is preferably at least one solvent selected from the group consisting of a nitrile compound solvent, an aromatic compound solvent, and an aliphatic compound solvent, more preferably at least one solvent selected from the group consisting of isobutyronitrile, toluene, and heptane, and particularly preferably at least one solvent selected from the group consisting of toluene and heptane.

The boiling point of the solvent is preferably 50° C. or higher, and more preferably 70° C. or higher at normal pressure (that is, 1 atm). The upper limit of the boiling point of the solvent is preferably 250° C. or lower, and more preferably 220° C. or lower at normal pressure (that is, 1 atm).

The electrode material may contain one kind of solvent alone, or two or more kinds of solvents.

The content of the solvent (including the solvent contained as a component of the electrolytic solution, and this is the same in this paragraph) in the electrode material is preferably 30 mass % or less, more preferably 20 mass % or less, and particularly preferably 15 mass % or less with respect to the total mass of the electrode material. In a case where the content of the solvent in the electrode material is 30 mass % or less, it is possible to suppress the deterioration of battery performance, and it is possible to suppress the oozing of the solvent during the forming of the electrode material. The lower limit of the content of the solvent in the electrode material is not limited, and may be 0 mass % or more, or more than 0 mass %.

The content of the liquid component in the electrode material is preferably 30 mass % or less, more preferably 20 mass % or less, and particularly preferably 15 mass % or less with respect to the total mass of the electrode material. In a case where the content of the liquid component in the electrode material is 30 mass % or less, it is possible to suppress the oozing of the liquid component during the forming of the electrode material. In addition, in a case where the liquid component contains a solvent, it is possible to suppress the deterioration of battery performance. The lower limit of the content of the liquid component in the electrode material is not limited, and may be 0 mass % or more, or more than 0 mass %.

As the electrode material, for example, the following materials can also be used in addition to the above materials.

(1) The granulated body described in paragraphs 0029 to 0037 of JP2017-104784A (2) The positive electrode mixture paint described in paragraph 0054 of JP2016-059870A (3) The composite particles described in paragraphs 0017 to 0070 of JP2016-027573A (4) The composite particles described in paragraphs 0020 to 0033 of JP6402200B (5) The electrode composition described in paragraphs 0040 to 0065 of JP2019-046765A (6) The materials (for example, active material, positive electrode slurry, and negative electrode slurry) described in paragraphs 0080 to 0114 of JP2017-054703A (7) The powder described in JP2014-198293A (8) The active material, binder, and composite particles described in paragraphs 0024 to 0025, 0028, and 0030 to 0032 of JP2016-062654A (Electrode Material Preparation Method)

The electrode material can be prepared by, for example, mixing the electrode active material with the above-described optional components other than the electrode active material.

Examples of the mixing method include a method using a ball mill, a beads mill, a planetary mixer, a blade mixer, a roll mill, a kneader, or a disk mill.

[Second Step]

The method of manufacturing a formed body for an electrode according to the present disclosure has the second step of placing a shape retaining member having a rectangular tubular shape with rectangular opening portions, in which one end portion X of a pair of long side end portions of one opening portion L is present closer to the other opening portion M than the other end portion Y of the pair of long side end portions, with the opening portion L facing down so that an axial direction of the shape retaining member is parallel to a direction of gravitational force, and supplying the electrode material into the shape retaining member from the other opening portion M of the shape retaining member after the first step.

In the second step, a pressure feed unit is preferably used as an electrode material supply unit from the viewpoint of continuously supplying the electrode material and continuously performing the second step, from the viewpoint of easily achieving bulk density $D_2$/bulk density $D_1$=1.1 to 30, and from the viewpoint of further making the density distribution of the electrode material uniform.

That is, in the second step, the electrode material is preferably pressure-fed into the shape retaining member from the opening portion M of the shape retaining member by the pressure feed unit to supply the electrode material into the shape retaining member from the opening portion M of the shape retaining member.

Hereinafter, a specific embodiment of the second step will be described with reference to the drawings.

Figure 2:
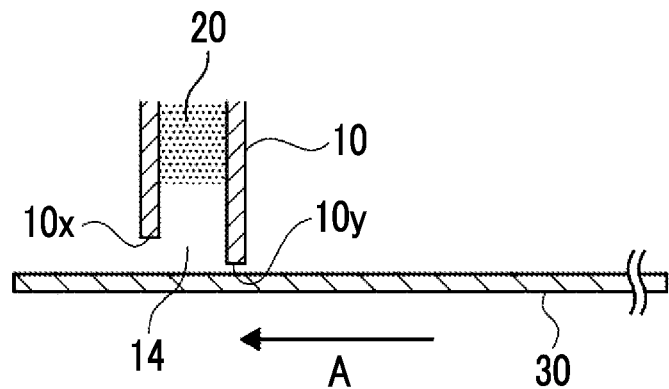
FIG. 2 is a schematic diagram for illustrating a movement of an electrode material in the second step shown in FIG. 1.
Figure 3:
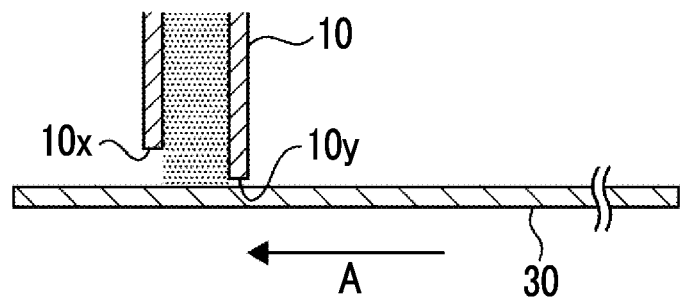
FIG. 3 is a schematic diagram for illustrating a movement of the electrode material in the second step shown in FIG. 1.

FIG. 1 is a schematic diagram illustrating an embodiment of the second step in the method of manufacturing a formed body for an electrode according to the present disclosure. FIGS. 2 and 3 are schematic diagrams for illustrating a movement of the electrode material in the second step shown in FIG. 1.

The second step will be described with reference to FIGS. 1 to 3.

FIG. 1 shows an aspect in which an electrode material 20 is supplied into a shape retaining member 10 from an opening portion M 12 of the shape retaining member 10 using a pressure feed unit 50.

Here, at an opening portion L 14 of the shape retaining member 10, one end portion X 10x of a pair of long side end portions of the opening portion L 14 is present closer to the other opening portion M 12 than the other end portion Y 10y of the pair of long side end portions.

As shown in FIG. 1, the shape retaining member 10 is placed with the opening portion L 14 facing down so that an axial direction (direction of arrow B) thereof is parallel to a direction of gravitational force (direction of arrow G). Therefore, in a case where the electrode material 20 is supplied from the opening portion M 12 of the shape retaining member 10, the electrode material 20 is buried in a space formed by a support 30 and the inside of the shape retaining member 10.

The pressure feed unit 50 shown in FIG. 2 includes a pair of roll members 50a and 50b, and a container 52 that is coupled to upper portions of the pair of roll members 50a and 50b and houses the electrode material 20.

By the rotation of the roll member 50a in a direction of the arrow a and the rotation of the roll member 50b in a direction of the arrow B, the electrode material 20 housed in the container 52 is sent with an increasing density.

In a case where the electrode material 20 is pressure-fed toward the opening portion M 12 of the shape retaining member 10 in this way, the density of the electrode material 20 in the shape retaining member 10 is likely to increase, and bulk density $D_2$/bulk density $D_1$=1.5 to 20 described above is likely to be achieved easily.

In a case where the electrode material 20 is pressure-fed using the pressure feed unit 50, the electrode material 20 may be formed into a plate shape before being supplied to the shape retaining member 10 depending on the pressure applied to the electrode material 20.

In this case, as shown in FIG. 2, the formed electrode material 20 is inserted into the shape retaining member 10, and as shown in FIG. 3, the formed electrode material 20 reaches and contacts the support 30.

Here, in a case where the electrode material 20 is formed by the pressure feed unit 50, the shape thereof preferably matches the internal shape (that is, the shape of a rectangular through hole) of the shape retaining member 10.

The movement of the formed electrode material 20 will be described in detail.

As shown in FIG. 2, in a case where the support 30 is transported and reaches a point below the opening portion L 14 of the shape retaining member 10, the supply of the formed electrode material 20 to the shape retaining member 10 is initiated. Then, as the supply of the formed electrode material 20 is continued, the formed electrode material 20 reaches and contacts the support 30 as shown in FIG. 3.

The example in which a pair of roll members is used has been shown as the pressure feed unit 50, but the pressure feed unit is not limited thereto, and any unit may be used as long as the electrode material 20 can be sent (that is, pressure-fed) with an increasing density. The pressure feed unit may be a screw feeder, a Mohno pump, a gear pump, or the like.

The aspect in which the electrode material 20 is pressure-fed into the shape retaining member 10 has been described above, but the method for achieving bulk density $D_2$/bulk density $D_1$=1.1 to 30 described above is not limited to this method.

Examples of the method for achieving bulk density $D_2$/bulk density $D_1$=1.1 to 30 described above include a method in which the electrode material 20 supplied into the shape retaining member 10 is compacted inside the shape retaining member 10.

Specific examples thereof include a method in which a space formed by the support 30 and the inside of the shape retaining member 10 is filled with the electrode material 20, and a weight is placed on the electrode material 20 filling the space to compact the electrode material 20 inside the shape retaining member 10.

[Shape Retaining Member]

The shape retaining member used in the second step has a rectangular tubular shape with rectangular opening portions, in which one end portion X of a pair of long side end portions of one opening portion L is present closer to the other opening portion M than the other end portion Y of the pair of long side end portions.

The shape retaining member is preferably made of a material whose shape does not change even by compaction of the electrode material.

For example, the shape retaining member is preferably made of a metal, particularly preferably stainless steel.

Regarding the size of the shape retaining member, the width $T_1$ of the opening portion L in the short side direction is preferably within the above-described range.

In addition, in a case where a width of the opening portion L of the shape retaining member in the long side direction is denoted by $T_3$, $T_3$ may be set according to the width of an electrode material film to be formed in the third step to be described later or a formed body for an electrode to be manufactured. The width $T_3$ is, for example, preferably 10 mm to 2,000 mm, more preferably 40 mm to 1,500 mm, and even more preferably 100 mm to 1,000 mm.

In a case where a height of the shape retaining member, that is, a length from the end portion Y of the opening portion L 14 to the opening portion M 12 is denoted by $T_4$, $T_4$ may be appropriately set according to the securing of the internal volume of the shape retaining member, formability of the electrode material, weight of the device, mobility, and the like. The length $T_4$ is, for example, preferably 5 mm to 1,000 mm, more preferably 10 mm to 500 mm, and even more preferably 30 mm to 300 mm.

In addition, the inner peripheral surface of the shape retaining member preferably has a surface texture to which the electrode material does not easily adhere from the viewpoint of smooth movement of the electrode material.

Specifically, the inner peripheral surface of the shape retaining member preferably has releasability.

In order to exhibit releasability, for example, the inner peripheral surface of the shape retaining member preferably has a surface layer containing at least one of a fluorine atom or a silicon atom.

The surface layer is preferably a layer containing at least one of a compound having a fluorine atom in the molecule or a compound having a silicon atom in the molecule.

The compound having a fluorine atom in the molecule is preferably a resin having a fluorine atom in the molecule, and specific examples thereof include a tetrafluoroethylene-perfluoroalkyl vinyl ether copolymer (PFA), polytetrafluoroethylene (PTFE), a tetrafluoroethylene-hexafluoropropylene copolymer (FEP), a polyethylene-tetrafluoroethylene copolymer (ETFE), polyvinylidene fluoride (PVDF), polychlorotrifluorinated ethylene (PCTFE), and polyvinyl fluoride (PVF).

The compound having a silicon atom in the molecule is preferably a resin having a silicon atom in the molecule. Specific examples of the resin having a silicon atom in the molecule include a methyl silicone resin, a phenyl silicone resin, a methyl phenyl silicone resin, an epoxy-modified silicone resin, a polyester-modified silicone resin, and a urethane-modified silicone resin.

In addition, the surface layer preferably further contains an antistatic agent.

As the antistatic agent, antistatic agents that have been known are used.

A commercially available coating agent may be used to form the surface layer. Specifically, for example, BICOAT (registered trademark) series manufactured by YOSHIDA SKT CO., LTD., and A coat, NF-004, NF-015, NF-004EC, NF-004A, NF-015A, NF-015EC manufactured by NIPPON FUSSO CO., LTD. are used.

"EC" series manufactured by NIPPON FUSSO CO., LTD. are antistatic coating agents.

In addition, the inner peripheral surface of the shape retaining member may have an undercoat layer as an underlayer of the surface layer.

Examples of the undercoat layer include a layer obtained by roughening the surface of the contact member by sandblasting or the like, and then applying a material mainly containing an epoxy resin.

In addition, the inner peripheral surface of the shape retaining member preferably has an arithmetic average roughness Ra of 10 μm or less from the viewpoint of a further increase of the releasability of the electrode material.

The arithmetic average roughness Ra of the inner peripheral surface of the shape retaining member is preferably 8 μm or less, and more preferably 5 μm or less.

The lower limit of the arithmetic average roughness Ra of the inner peripheral surface of the shape retaining member is, for example, 0.05 μm.

The arithmetic average roughness Ra of the inner peripheral surface of the shape retaining member is measured by the following method.

Measurement with a laser displacement gauge or the like is performed on the inner peripheral surface of the shape retaining member, and a surface shape profile is calculated. The arithmetic average roughness is obtained by the following expression by extracting a standard length L from the calculated roughness curve in a direction of the average line of the roughness curve, taking an x-axis in the direction of the average line and a y-axis in a direction of longitudinal magnification of the extracted part, and expressing the roughness curve as $y=f(x)$.

$$Ra = \frac{1}{L}\int_0^L |f(x)|dx$$

[Third Step]

The method of manufacturing a formed body for an electrode according to the present disclosure has the third step of discharging the electrode material in the shape retaining member onto a support from the opening portion L while relatively moving the opening portion L of the shape retaining member and the support along a short side direction of the opening portion L, to form a film of the electrode material on the support after the second step.

Here, the electrode material discharged from the opening portion L is supplied onto the support while passing through a void between the end portion X and the support.

Hereinafter, a specific embodiment of the third step will be described with reference to the drawing.

Here, the third step will be described using FIG. 4. Here, FIG. 4 is a schematic diagram illustrating an embodiment of the third step in the method of manufacturing a formed body for an electrode according to the present disclosure.

Figure 4:
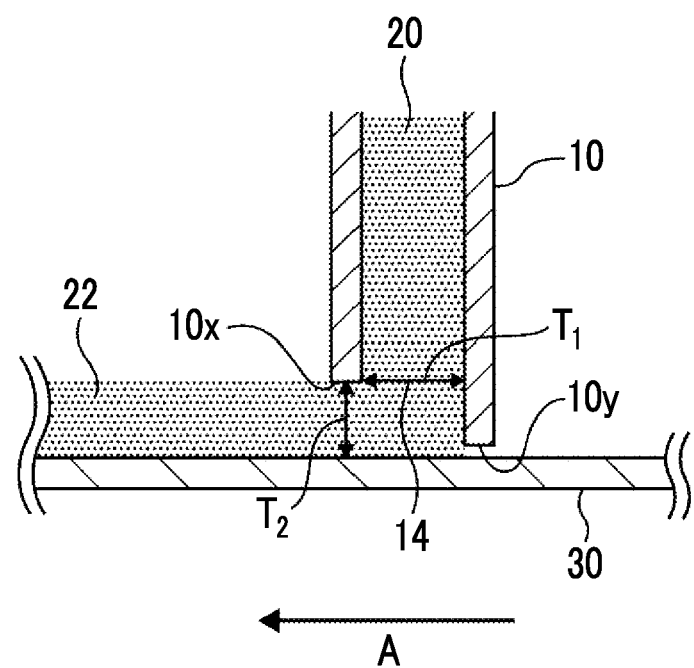
FIG. 4 is a schematic diagram illustrating an embodiment of a third step in the method of manufacturing a formed body for an electrode according to the present disclosure.

FIG. 4 shows an aspect in which the electrode material 20 is discharged onto the support 30 transported in a direction of the arrow A from the opening portion L 14 of the shape retaining member 10, and an electrode material film 22 of the electrode material 20 is formed on the support 30.

The operation of forming the electrode material film 22 will be described in detail.

As shown in FIG. 4, at the opening portion L 14 of the shape retaining member 10, one end portion (that is, a side) X 10x of the pair of long side end portions of the opening portion L 14 is present closer to the other opening portion M 12 than the other end portion (that is, a side) Y 10y of the pair of long side end portions, and a void with a distance $T_2$ is formed between the end portion X 10x and the support.

Therefore, the electrode material 20 discharged from the opening portion L 14 of the shape retaining member 10 is transported to the void formed between the end portion X 10x and the support as the support is moved in the direction of the arrow A. The transported electrode material 20 is regulated in film thickness by a film thickness regulating force acting while passing through the void, and an electrode material film 22 having a thickness that is the same as the size of the void, that is, the distance $T_2$ is formed.

In the method of manufacturing a formed body for an electrode according to the present disclosure, as described above, width $T_1$>distance $T_2$ is established, and thus it is thought that the electrode material 20 is compacted by a pressure applied by the above-described film thickness regulating force, and the density distribution is further reduced.

In FIG. 4, the smaller the distance between the end portion Y 10y of the opening portion L 14 of the shape retaining member 10 and the support 30, the better from the viewpoint that the electrode material 20 is efficiently moved to the void formed between the end portion X 10x and the support 30. The distance is, for example, preferably 10 μm or less, and more preferably 5 μm or less.

In addition, in a case where the distance between the end portion Y 10y and the support 30 is too small, the end portion Y 10y and the support 30 may be brought into contact with each other, and the support 30 may be damaged. Therefore, the lower limit is preferably, for example, 1 μm.

In the shape retaining member 10 shown in FIGS. 1 to 4, the end portion X 10x of the opening portion L is formed from the skeleton of the shape retaining member 10, but is not limited to this configuration as long as the above-described distance $T_2$ is obtained. For example, the shape retaining member may have another member (for example, roll member) at a position corresponding to the end portion X.

FIGS. 1 to 4 show the aspect in which the support 30 is transported in the direction of the arrow A with respect to the fixed shape retaining member 10, but the present disclosure is not limited thereto.

In the method of manufacturing a formed body for an electrode according to the present disclosure, the opening portion L of the shape retaining member and the support may be relatively moved along the short side direction of the opening portion L. In addition to the above aspect, an aspect in which the shape retaining member is moved with respect to the fixed support, or an aspect in which both the support and the shape retaining member are moved may be employed.

In order to continuously form the electrode material film 22, an aspect in which a long support is used and moved with respect to the fixed shape retaining member is preferable.

Here, the transport mechanism for the support is not limited, and known transport units can be used. Examples thereof include a belt conveyor, a linear motion guide, and a cross roller table.

[Support]

The support used in the third step has a larger area than the opening portion L of the shape retaining member since it is required to receive the electrode material discharged from the opening portion L of the shape retaining member.

In particular, a long support is preferably used from the viewpoint of continuously forming the electrode material film. In a case of the long support, its width is preferably larger than the width $T_3$ in the long side direction of the opening portion L of the shape retaining member, and specifically, the width is preferably 0.5% or more (more preferably 2% or more) larger than $T_3$.

The support may be appropriately selected according to the post-step to be performed on the formed body for an electrode manufactured through the third step.

Preferable specific examples of the support include a release material and a collector.

Examples of the release material as an example of the support include release paper (for example, release paper manufactured by LINTEC Corporation), surface-treated metals (for example, aluminum and stainless steel (generally referred to as "SUS"), films having a surface layer, and paper having a surface layer. Among these, release paper is preferable.

The collector as an example of the support is not particularly limited, and known collectors (positive electrode collector and negative electrode collector) can be used.

Examples of the positive electrode collector include aluminum, aluminum alloys, stainless steel, nickel, and titanium. The positive electrode collector is preferably aluminum or an aluminum alloy. The positive electrode collector is also preferably aluminum or stainless steel having a surface with a coating layer containing carbon, nickel, titanium, or silver.

Examples of the negative electrode collector include aluminum, copper, copper alloys, stainless steel, nickel, and titanium. The negative electrode collector is preferably aluminum, copper, a copper alloy, or stainless steel, and more preferably copper or a copper alloy. The negative electrode collector is also preferably aluminum, copper, a copper alloy, or stainless steel having a surface with a coating layer containing carbon, nickel, titanium, or silver.

As the collector, aluminum foil or copper foil is preferable. Aluminum foil is usually used as a collector at the positive electrode. Copper foil is usually used as a collector at the negative electrode.

The shape of the support is preferably a flat plate shape, a film shape, or a sheet shape from the viewpoint of transportability and the like.

The average thickness of the support is preferably 5 μm or more, more preferably 10 μm or more, and particularly preferably 20 μm or more from the viewpoint of transportability and the like.

The average thickness is preferably 500 μm or less, more preferably 300 μm or less, and particularly preferably 200 μm or less from the viewpoint of flexibility and lightweight property.

The average thickness of the support is an arithmetic average of the thicknesses measured at three points by cross-section observation. In the cross-section observation, known microscopes (for example, a scanning electron microscope) can be used.

The size of the support is not limited, and may be determined according to the size of a formed body for an electrode to be manufactured, the sizes of various members used in the manufacturing process, and the like.

[Fourth Step]

The method of manufacturing a formed body for an electrode according to the present disclosure may optionally have the fourth step of regulating the film thickness of the electrode material film formed on the support after the third step.

By regulating the film thickness of the electrode material film, the in-plane uniformity of the mass distribution of a formed body for an electrode can be further increased.

The fourth step will be described with reference to FIG. 5. Here, FIG. 5 is a schematic diagram illustrating the fourth step in the method of manufacturing a formed body for an electrode according to the present disclosure.

Figure 5:
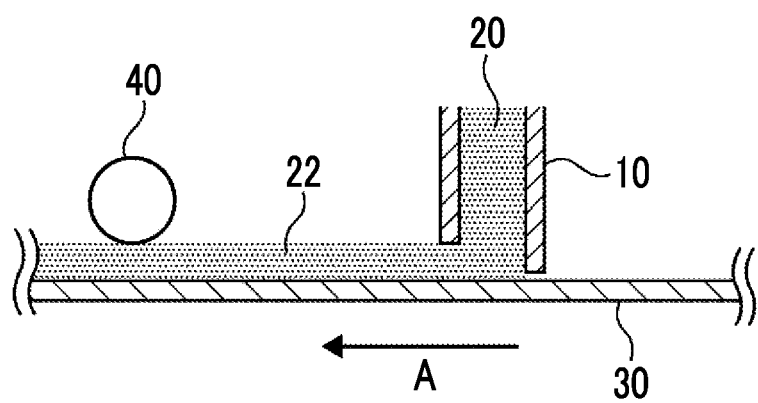
FIG. 5 is a schematic diagram for illustrating a fourth step in the method of manufacturing a formed body for an electrode according to the present disclosure.

As shown in FIG. 5, the film thickness of the electrode material film 22 formed on the support 30 is regulated by a regulating roll 40.

Examples of the regulating unit used in the fourth step include a roll member such as a regulating roll (for example, also referred to as a squeegee roll), a scraper, and a plate-shaped member (for example, a squeegee).

In the present disclosure, in the regulation of the amount, density distribution, and the like of the electrode material, in addition to the above-described regulating unit, a vibrating unit vibrating the electrode material may be used in combination.

By providing the vibrating unit, the amount, density distribution, and the like of the electrode material are easily controlled.

Examples of the vibrating unit include a general vibrator.

[Fifth Step]

The method of manufacturing a formed body for an electrode according to the present disclosure may have the fifth step of placing a protective member on the formed electrode material film after the third step or the fourth step.

By placing the protective member on the electrode material film, it is possible to suppress the scattering or peeling of a part of the electrode material from the electrode material film, and it is possible to further improve workability and transportability in the post step.

The protective member may be a member that protects the electrode material from scattering, peeling, and the like. Specifically, for example, a release material or a collector is preferable as in the case of the above-described support. The release material and the collector used as the protective member are the same as those used as the support, and preferable aspects are also the same.

In the method of manufacturing a formed body for an electrode according to the present disclosure, in a case where both the support and the protective member are not collectors, and for example, a collector is used as the support, a release material is selected as the protective member.

[Other Steps]

The method of manufacturing a formed body for an electrode according to the present disclosure may include the following other steps.

For example, a sixth step of pressurizing the electrode material film, a seventh step of transferring the electrode material film onto the protective member placed in the fifth step, and the like may be included.

(Sixth Step)

The method of manufacturing a formed body for an electrode according to the present disclosure may have the sixth step of pressurizing the electrode material film after the third step, the fourth step, or the fifth step.

In a case where the method of manufacturing a formed body for an electrode according to the present disclosure includes the forming step, the density of the electrode material can be increased, and the density can be made uniform.

Examples of the pressurizing unit used in the sixth step include a pressurizing roll pair and a press machine.

In a case where the electrode material is pressurized, the pressure is preferably 1 MPa to 1 GPa, more preferably 5 MPa to 500 MPa, and particularly preferably 10 MPa to 300 MPa.

In the sixth step, the electrode material may be pressurized in a stepwise manner using a plurality of pressurizing units (for example, a pressurizing roll pair). By pressurizing the electrode material in a stepwise manner using a plurality of pressurizing units, the density distribution of the electrode material can be made more uniform.

For example, using a plurality of pressurizing roll pairs in which a gap between the rolls is adjusted to be narrower in a stepwise manner, the electrode material can be pressurized in a stepwise manner.

In the sixth step, the pressurizing unit and the electrode material (specifically, the first support on which the electrode material is supplied) are preferably relatively moved.

In the present disclosure, "relatively moving the pressurizing unit and the electrode material" includes moving the pressurizing unit with respect to the electrode material in one direction, moving the electrode material with respect to the pressurizing unit in one direction, and respectively moving the pressurizing unit and the electrode material in one direction. Among these, moving the electrode material with respect to the pressurizing unit in one direction is preferable as the method of "relatively moving the pressurizing unit and the electrode material".

The unit that moves the electrode material (specifically, the support on which the electrode material film is formed) is not limited, and known transport units can be used. Examples thereof include a belt conveyor, a linear motion guide, and a cross roller table.

In the sixth step, for example, the electrode material heated at 30° C. to 100° C. may be pressurized from the viewpoint of an improvement in formability.

(Seventh Step)

In the method of manufacturing a formed body for an electrode according to the present disclosure, the seventh step of transferring the electrode material onto the protective member may be performed after the fifth step.

In the seventh step, after the laminate in which the electrode material film is sandwiched between the support and the protective member is formed through the fifth step, the laminate is inverted upside down to transfer the electrode material onto the protective member.

In the seventh step, in a case where the protective member is a collector, the electrode material is transferred onto the protective member, and a formed body for an electrode with a collector is obtained.

<<Formed Body for Electrode>>

A formed body for an electrode obtained by the method of manufacturing a formed body for an electrode according to the present disclosure is excellent in in-plane uniformity of a density, and can thus be used as various electrodes.

The formed body for an electrode is preferably a formed body for an electrode for an all-solid state secondary battery.

The shape of the formed body for an electrode is not limited, and may be appropriately determined depending on the intended use. The shape of the formed body for an electrode is preferably a flat plate shape.

The average thickness of the formed body for an electrode is preferably 0.01 mm to 2 mm, more preferably 0.05 mm to 1.5 mm, and particularly preferably 0.1 mm to 1 mm from the viewpoint of an improvement in battery performance (for example, discharge capacity and output characteristics).

The average thickness of the formed body for an electrode is measured in the same manner as the average thickness of the first support.

EXAMPLES

Hereinafter, the present disclosure will be described in detail with examples, but is not limited thereto.

<Preparation of Sulfide-Based Inorganic Solid Electrolyte (Li—P—S-Based Glass)>

A sulfide-based inorganic solid electrolyte was prepared with reference to T. Ohtomo, A. Hayashi, M. Tatsumisago, Y Tsuchida, S. Hama, K. Kawamoto, Journal of Power Sources, 233, (2013), pp. 231 to 235, and A. Hayashi, S. Hama, H. Morimoto, M. Tatsumisago, T. Minami, Chem. Lett., (2001), pp 872 to 873.

Specifically, in a glove box under an argon atmosphere (dew point: −70° C.), 2.42 g of lithium sulfide ($Li_2S$, manufactured by Sigma-Aldrich Inc., purity: >99.98%) and 3.9 g of diphosphorus pentasulfide ($P_2S_5$, manufactured by Sigma-Aldrich Inc., purity: >99%) were respectively weighed, and then the lithium sulfide and the diphosphorus pentasulfide were mixed for 5 minutes using an agate mortar. The molar ratio of $Li_2S$ to $P_2S_5$ ($Li_2S:P_2S_5$) was 75:25.

66 zirconia beads having a diameter of 5 mm were put in a 45 mL zirconia container (manufactured by Fritsch GmbH). Then, the entire amount of the mixture of the lithium sulfide and the diphosphorus pentasulfide was put therein, and then the container was completely sealed under an argon atmosphere. The container was mounted on a planetary ball mill P-7 (trade name) manufactured by Fritsch GmbH, and mechanical milling was performed for 20 hours at a temperature of 25° C. and a rotation speed of 510 rpm (revolutions per minute) to obtain 6.2 g of a yellow powder of a sulfide-based solid electrolyte (Li—P—S-based glass). The above steps were repeated 10 times, and 62 g of a sulfide-based solid electrolyte was obtained.

Example 1

[Preparation of Electrode Material (P-1) for Positive Electrode]

180 zirconia beads having a diameter of 5 mm were put in a 45 mL zirconia container (manufactured by Fritsch GmbH), and then 3.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm. Next, 6.8 g of LCO ($LiCoO_2$, manufactured by Nippon Chemical Industrial CO., LTD.) as an active material and Li-100 (0.2 g) manufactured by Denka Company as a conductive auxiliary agent were put in the container. Then, the container was mounted on the planetary ball mill P-7, and mixing was performed for 10 minutes at a temperature of 25° C. and a rotation speed of 100 rpm to obtain a particulate electrode material (P-1) for a positive electrode. The above steps were repeated 100 times, and a required amount of an electrode material (P-1) for a positive electrode was obtained.

A bulk density $D_1$ of the obtained electrode material (P-1) for a positive electrode, measured by the method described above, was 0.3 g/cm³.

[Preparation of Shape Retaining Member]

A shape retaining member 10 as shown in FIG. 1 was prepared.

That is, the shape retaining member 10 having a rectangular tubular shape with rectangular opening portions, in which one end portion X 10x of a pair of long side end portions of one opening portion L 14 was present closer to the other opening portion M 12 than the other end portion Y 10y of the pair of long side end portions was produced.

Here, in the shape retaining member 10, a distance between the end portion X 10x and the opening portion M 12 was 49.50 mm, and $T_4$ from the end portion Y 10y to the opening portion M 12 was 50.00 mm. In addition, a width $T_1$ of the opening portion L 14 in a short side direction was 15 mm, and a width $T_3$ of the opening portion L 14 in a long side direction was 180 mm.

Subsequently, a surface layer was formed on an inner peripheral surface of the shape retaining member by the following method.

First, an undercoat layer was formed on the inner peripheral surface of the shape retaining member by the method described above, and then fluororesin coating was performed using NF-004 (main material: FEP) manufactured by NIPPON FUSSO CO., LTD. to form a surface layer.

[Production of Positive Electrode Sheet]

A positive electrode sheet was produced as follows by the method shown in FIG. 1.

The electrode material (P-1) for a positive electrode was put in four screw feeders (powder measuring feeders (screw type) manufactured by AS ONE Corporation, PSF-100SA) placed in parallel. A pressure feed unit 50 as shown in FIG. 1 was provided in a lower portion of the screw feeder, and the electrode material (P-1) for a positive electrode was supplied to the opening portion L 14 of the shape retaining member 10 through the pressure feed unit 50.

Both the pair of roll members 50a and 50b of the pressure feed unit 50 were stainless steel roll members having an outer diameter of 50 mm, a distance between the rolls was 15 mm, and the rotation speed of the rolls was 5 m/min.

In the lower portion of the pressure feed unit 50, the shape retaining member 10 was placed with the opening portion L 14 facing down so that an axial direction thereof was parallel to a direction of gravitational force (direction of arrow G in FIG. 1). More specifically, the shape retaining member 10 was placed with the opening portion L 14 facing down so that a void of 5 μm was formed between the end portion Y 10y of the shape retaining member 10 and the support 30, and a distance $T_2$ between the end portion X 10x of the shape retaining member 10 and the support 30 was 0.5 mm (500 μm) by being adjusted using a taper gauge or the like.

That is, the distance $T_2$ between the end portion X 10x of the shape retaining member 10 and the support 30 was 0.5 mm (500 μm), and the distance between the end portion Y 10y of the shape retaining member 10 and the support 30 was 5 μm.

After the support 30 was transported in a direction of the arrow A at a transportation speed of 5 m/min and reached a point below the opening portion L 14, the electrode material (P-1) for a positive electrode was pressure-fed into the shape retaining member 10 by the pressure feed unit 50, and discharged onto the support 30 through the shape retaining member 10.

Here, the support 30 was release paper: release paper manufactured by LINTEC Corporation (glassine direct type, average thickness: 60 μm, width: 200 mm, length: 300 mm).

A bulk density $D_2$ of the electrode material at the opening portion L 14 of the shape retaining member 10, measured as described above, was 1.2 g/cm³.

Through the above procedure, a powder sheet (positive electrode sheet) having a thickness of 500 μm, a width of 180 mm, and a length of 290 mm was obtained on the support 30.

Examples 2 to 5

Powder sheets were produced in the same manner as in Example 1, except that the shape of the shape retaining member was appropriately changed, and the width $T_1$ and the distance $T_2$ were changed as shown in the following Table 1.

Examples 6 to 11

Powder sheets were produced in the same manner as in Examples 1 to 3, except that the shape of the shape retaining member was appropriately changed, the length (height) $T_4$ from the end portion Y 10y of the shape retaining member 10 to the opening portion M 12 was 400 mm, the width $T_1$ and the distance $T_2$ were changed as shown in the following Table 1, and the pressure feed unit 50 was not used.

More specifically, the support 30 was placed below the opening portion L 14, the electrode material (P-1) for a positive electrode was put in the shape retaining member 10 with a spatula so as to fill the whole volume of the shape retaining member, a weight of 500 g or 3,000 g was placed on the electrode material (P-1) for a positive electrode, and then the support 30 was transported in the direction of the arrow A at a transportation speed of 5 m/min to discharge the electrode material (P-1) for a positive electrode onto the support 30.

Example 12

A powder sheet was produced by the same procedure as in Example 1, except that an electrode material (P-2) for a positive electrode prepared by kneading the electrode material (P-1) for a positive electrode and an electrolytic solution was used. The content of the electrolytic solution was 30 mass % with respect to the total mass of the electrode material (P-2) for a positive electrode. A lithium hexafluorophosphate solution (1.0 M $LiPF_6$ in EC/EMC=50/50 (v/v)) manufactured by Sigma-Aldrich Inc. was used as the electrolytic solution. "EC" means ethylene carbonate. "EMC" means ethyl methyl carbonate.

Example 13

A powder sheet was produced by the same procedure as in Example 6, except that the electrode material (P-2) for a positive electrode was used.

Comparative Example 1

A powder sheet (positive electrode sheet) was produced in the same manner as in Example 1, except that the support 30 was placed below the opening portion L 14, the electrode material (P-1) for a positive electrode was put in the shape retaining member 10 with a spatula so as to fill the whole volume of the shape retaining member, and then the support 30 was transported in the direction of the arrow A at a transportation speed of 5 m/min.

Comparative Example 2

A powder sheet (positive electrode sheet) was produced in the same manner as in Example 1, except that the shape retaining member 10 was not used.

That is, the electrode material pressure-fed by the pair of rolls 50a and 50b of the pressure feed unit 50 was supplied onto the support as it was, and the powder sheet was produced.

Comparative Example 3

A powder sheet was produced in the same manner as in Example 1, except that the shape of the shape retaining member 10 was appropriately changed, and the width $T_1$ and the distance $T_2$ were changed as shown in the following Table 1.

<Evaluation>
<Evaluation of Uniformity of Mass Distribution>

Test pieces having a size of 1 $cm^2$ were cut out from 80 places ([8 places in width direction]×[10 places in length direction]) in the powder sheet. A frame-shaped Thomson blade in which the area inside the frame per frame was adjusted to 1 $cm^2$ was used to cut out the test piece. Next, the mass of each of the test pieces cut out from the total 80 places in the powder sheet was measured. From the mass of the test pieces, a mass standard deviation (a) of the whole powder sheet was obtained, and uniformity of the mass distribution was evaluated according to the following criteria. Of the following criteria, A, B, and C were accepted.

(Criteria)
A: $0\% \leq \sigma < 1\%$
B: $1\% \leq \sigma < 3\%$
C: $3\% \leq \sigma < 5\%$
D: $5\% \leq \sigma < 10\%$
E: $10\% \leq \sigma$

TABLE 1

| | | | Conditions | | | | | | Presence or | | |
|---|---|---|---|---|---|---|---|---|---|---|---|
| | | Electrode Material | Bulk Density $D_1$ [g/cm³] | Bulk Density $D_2$ [g/cm³] | $D_2/D_1$ | Width $T_1$ [mm] | Distance $T_2$ [mm] | $T_1/T_2$ | Absence of Pressure Feed Unit | Mass of Weight [g] | Mass Distribution σ [%] |
| Examples | 1 | (P-1) | 0.3 | 1.2 | 4 | 15 | 0.5 | 30 | Presence | — | 0.8 (A) |
| | 2 | (P-1) | 0.3 | 1.2 | 4 | 1.5 | 0.5 | 3 | Presence | — | 1.4 (B) |
| | 3 | (P-1) | 0.3 | 1.2 | 4 | 20 | 0.2 | 100 | Presence | — | 1.8 (B) |
| | 4 | (P-1) | 0.3 | 1.2 | 4 | 15 | 1.0 | 15 | Presence | — | 1.6 (B) |
| | 5 | (P-1) | 0.3 | 1.2 | 4 | 15 | 0.1 | 150 | Presence | — | 1.9 (B) |
| | 6 | (P-1) | 0.3 | 0.6 | 2 | 15 | 0.5 | 30 | Absence | 500 | 2.8 (B) |
| | 7 | (P-1) | 0.3 | 0.6 | 2 | 1.5 | 0.5 | 3 | Absence | 500 | 3.2 (C) |
| | 8 | (P-1) | 0.3 | 0.6 | 2 | 20 | 0.2 | 100 | Absence | 500 | 3.4 (C) |
| | 9 | (P-1) | 0.3 | 1.8 | 6 | 15 | 0.5 | 30 | Absence | 3000 | 1.8 (B) |
| | 10 | (P-1) | 0.3 | 1.8 | 6 | 1.5 | 0.5 | 3 | Absence | 3000 | 2.2 (B) |
| | 11 | (P-1) | 0.3 | 1.8 | 6 | 20 | 0.2 | 100 | Absence | 3000 | 2.3 (B) |
| | 12 | (P-2) | 0.3 | 1.2 | 4 | 15 | 0.5 | 30 | Presence | — | 2.5 (B) |
| | 13 | (P-2) | 0.3 | 0.6 | 2 | 15 | 0.5 | 30 | Absence | 500 | 3.6 (C) |

TABLE 1-continued

| | | | Conditions | | | | | Presence or Absence of Pressure Feed Unit | Mass of Weight [g] | Mass Distribution σ [%] |
| | | Electrode Material | Bulk Density $D_1$ [g/cm³] | Bulk Density $D_2$ [g/cm³] | $D_2/D_1$ | Width $T_1$ [mm] | Distance $T_2$ [mm] | $T_1/T_2$ | | | |
|---|---|---|---|---|---|---|---|---|---|---|---|
| Comparative Examples | 1 | (P-1) | 0.3 | 0.3 | 1 | 5 | 0.5 | 10 | Presence | — | 7.0 (D) |
| | 2 | (P-1) | 0.3 | 1.2 | 4 | — | — | — | Presence | — | 15.0 (E) |
| | 3 | (P-1) | 0.3 | 1.2 | 4 | 1.0 | 1.0 | 1 | Presence | — | 6.5 (D) |

From Table 1, it has been found that Examples 1 to 13 are higher in uniformity of the mass distribution than Comparative Examples 1 to 3.

EXPLANATION OF REFERENCES

10: shape retaining member
10x: end portion X
10y: end portion Y
12: opening portion M
14: opening portion L
20: electrode material
22: electrode material film
30: support
40: regulating roll
50: pressure feed unit
50a: roll member
50b: roll member
52: container
A: transport direction of support 30
B: axial direction of shape retaining member 10
G: direction of gravitational force
a: rotation direction of roll member 50a
b: rotation direction of roll member 50b The entire disclosure of JP2019-149867 filed on Aug. 19, 2019 is incorporated herein by reference. All literatures, patent applications, and technical standards described herein are incorporated herein by reference to the same extent as if each literature, patent application, or technical standard is specifically and individually indicated as being incorporated by reference.

What is claimed is:

1. A method of manufacturing a formed body for an electrode comprising in order:
 a first step of preparing an electrode material containing an electrode active material;
 a second step of placing a shape retaining member having a rectangular tubular shape with rectangular opening portions, in which one end portion X of a pair of long side end portions of one opening portion L is present closer to the other opening portion M than the other end portion Y of the pair of long side end portions, with the opening portion L facing down so that an axial direction of the shape retaining member is parallel to a direction of gravitational force, and supplying the electrode material into the shape retaining member from the opening portion M of the shape retaining member; and
 a third step of discharging the electrode material in the shape retaining member onto a support from the opening portion L while relatively moving the opening portion L of the shape retaining member and the support along a short side direction of the opening portion L, to form a film of the electrode material on the support,
 wherein in a case where a bulk density of the electrode material prepared in the first step is denoted by $D_1$ [g/cm³] and a bulk density of the electrode material at the opening portion L of the shape retaining member is denoted by $D_2$ [g/cm³], bulk density $D_2$/bulk density $D_1$=1.1 to 30 is satisfied, and
 in a case where a width of the opening portion L in the short side direction is denoted by $T_1$ [mm] and a distance between the end portion X of the opening portion L and the support is denoted by $T_2$ [mm], a relationship of width $T_1$>distance $T_2$ is satisfied.

2. The method of manufacturing a formed body for an electrode according to claim 1,
 wherein the width $T_1$ and the distance $T_2$ satisfy width $T_1$/distance $T_2$=1.5 to 500.

3. The method of manufacturing a formed body for an electrode according to claim 1,
 wherein the distance $T_2$ is 0.1 mm to 1.0 mm.

4. The method of manufacturing a formed body for an electrode according to claim 1,
 wherein the width $T_1$ is 1.5 mm to 50 mm.

5. The method of manufacturing a formed body for an electrode according to claim 1,
 wherein the bulk density $D_2$ is 0.55 g/cm³ to 3.0 g/cm³.

6. The method of manufacturing a formed body for an electrode according to claim 1,
 wherein the bulk density $D_1$ is 0.1 g/cm³ to 0.5 g/cm³.

7. The method of manufacturing a formed body for an electrode according to claim 1,
 wherein the bulk density $D_1$ and the bulk density $D_2$ satisfy bulk density $D_2$/bulk density $D_1$=1.5 to 20.

8. The method of manufacturing a formed body for an electrode according to claim 1,
 wherein in the second step, the electrode material is pressure-fed into the shape retaining member from the opening portion M of the shape retaining member by a pressure feed unit to supply the electrode material into the shape retaining member from the opening portion M of the shape retaining member.

* * * * *